United States Patent
Nirula et al.

(10) Patent No.: US 10,871,576 B2
(45) Date of Patent: Dec. 22, 2020

(54) ERROR MITIGATION IN DOPPLER BASED SATELLITE POSITIONING SYSTEM MEASUREMENTS

(71) Applicant: QUALCOMM Incorporated, San Diego, CA (US)

(72) Inventors: Gautam Nirula, Santa Clara, CA (US); William Morrison, San Francisco, CA (US); Songwon Jee, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 159 days.

(21) Appl. No.: 16/108,019

(22) Filed: Aug. 21, 2018

(65) Prior Publication Data

US 2019/0353800 A1    Nov. 21, 2019

Related U.S. Application Data

(60) Provisional application No. 62/672,165, filed on May 16, 2018.

(51) Int. Cl.
*G01S 19/40* (2010.01)
*G01S 19/22* (2010.01)
(Continued)

(52) U.S. Cl.
CPC ............ *G01S 19/40* (2013.01); *G01S 19/22* (2013.01); *G01S 19/52* (2013.01)

(58) Field of Classification Search
CPC .......... G01S 19/40; G01S 19/52; G01S 19/22; G01S 19/20; G01S 19/24; G01S 19/23; G01S 19/44; G01S 19/256
See application file for complete search history.

(56) References Cited

U.S. PATENT DOCUMENTS 4,578,678 A * 3/1986 Hurd ................. G01S 19/29
                                                                342/357.25
6,072,428 A * 6/2000 Schipper ............. G01S 19/426
                                                                342/357.25

(Continued)

FOREIGN PATENT DOCUMENTS

CN    105116431 A    12/2015
CN    106443728 A     2/2017

OTHER PUBLICATIONS

Ertan T., et al., "GNSS Multipath Mitigation using High-Frequency Antenna Motion", Proceedings of the 26th International Technical Meeting of The Satellite Division of the Institute of Navigation, 2013, pp. 1-22.

(Continued)

*Primary Examiner* — Bernarr E Gregory

(57) ABSTRACT

Disclosed embodiments facilitate accuracy and decrease error in terrestrial positioning systems, including errors induced by multipath (e.g. ground reflections) in doppler based measurements of SVs. In some embodiments, one or more Global Navigation Satellite System (GNSS) doppler measurements and one or more corresponding GNSS pseudorange measurements for one or more satellites may be obtained. One or more GNSS doppler estimates corresponding to the one or more GNSS doppler measurements may be determined, wherein for a GNSS doppler measurement, the corresponding GNSS doppler estimate may be determined based, in part, on the GNSS doppler measurement and a GNSS pseudorange measurement corresponding to the GNSS doppler measurement. A speed of the UE may be determined based, in part, on the one or more GNSS doppler estimates.

30 Claims, 10 Drawing Sheets

(51) Int. Cl.
*G01S 19/52* (2010.01)
*G01S 19/29* (2010.01)
*G01S 19/49* (2010.01)
*G01S 19/47* (2010.01)
*G01S 19/25* (2010.01)
*G01S 19/00* (2010.01)

(56) References Cited

U.S. PATENT DOCUMENTS

| | | | | |
|---|---|---|---|---|
| 6,297,770 | B1* | 10/2001 | Ueda | G01S 19/254 342/357.62 |
| 6,483,457 | B2* | 11/2002 | Hirata | G01S 19/29 342/357.62 |
| 6,661,371 | B2* | 12/2003 | King | G01S 19/256 342/357.62 |
| 6,664,923 | B1* | 12/2003 | Ford | G01S 19/44 342/357.59 |
| 6,718,174 | B2* | 4/2004 | Vayanos | G01S 19/52 342/104 |
| 7,269,512 | B2* | 9/2007 | Mori | G01S 19/42 701/469 |
| 8,149,163 | B2* | 4/2012 | Toda | G01S 19/23 342/357.3 |
| 10,203,417 | B2* | 2/2019 | Zhodzishsky | G01S 19/52 |
| 2003/0162552 | A1* | 8/2003 | Lehtinen | G01S 19/52 455/456.1 |
| 2005/0116860 | A1* | 6/2005 | Kishimoto | G01S 19/24 342/357.63 |
| 2008/0018531 | A1* | 1/2008 | Matsumoto | G01S 19/29 342/357.68 |
| 2009/0002226 | A1* | 1/2009 | Mo | G01S 19/24 342/357.25 |
| 2010/0265133 | A1 | 10/2010 | Kholostov et al. | |
| 2010/0328150 | A1* | 12/2010 | Yu | G01S 19/20 342/357.58 |
| 2011/0071755 | A1* | 3/2011 | Ishigami | G01S 19/49 701/478.5 |
| 2012/0038508 | A1 | 2/2012 | Mizuochi et al. | |
| 2014/0378171 | A1 | 12/2014 | Rudow et al. | |
| 2016/0327654 | A1* | 11/2016 | Kumabe | G01S 19/52 |
| 2017/0067999 | A1 | 3/2017 | Chhokra et al. | |
| 2017/0068001 | A1 | 3/2017 | Chhokra et al. | |

OTHER PUBLICATIONS

Favenza A., et al., "A Machine Learning Approach to GNSS Scintillation Detection: Automatic Soft Inspection of the Events", Proceedings of the 30th International Technical Meeting of The Satellite Division of the Institute of Navigation, Sep. 2017, 10 pages.

International Search Report and Written Opinion—PCT/US2019/021121—ISA/EPO—Jun. 15, 2020.

* cited by examiner

ERROR MITIGATION IN DOPPLER BASED SATELLITE POSITIONING SYSTEM MEASUREMENTS

CROSS REFERENCE TO RELATED APPLICATIONS

This application claims the benefit of and priority to U.S. Provisional Application No. 62/672,165 entitled "ERROR MITIGATION IN DOPPLER BASED SATELLITE POSITIONING SYSTEM MEASUREMENTS," filed May 16, 2018, which is assigned to assignee hereof and hereby incorporated by reference in its entirety.

FIELD

The subject matter disclosed herein relates generally to terrestrial positioning systems, and in particular, to systems and methods to facilitate accurate Doppler based satellite positioning system measurements.

BACKGROUND

Satellite Positioning Systems (SPS) such as Global Navigation Satellite Systems (GNSS) are often used to determine speed, position, or other parameters related to the location and/or motion of a User Equipment (UE). Range measurements may refer to distance measurements (e.g. based on propagation delay) between two entities, such as a UE and a Space Vehicle (SV) such as a satellite. Range rate measurements refer to the rate of change of distance between two entities such as a UE and a SV. A range rate measurement may be obtained based on the difference between two range measurements over some time period. Range rate measurements may indicate whether the distance between the UE and SV is decreasing (the UE and/or SV are moving toward the other) at some point in time, or increasing (the UE and/or SV is moving away from the other) at some point in time. Doppler frequency shifts (e.g. relative to a reference signal frequency or expected signal frequency), or changes in Doppler frequency shifts associated with transmissions by a SV received at a UE, may be used to determine a velocity (speed and direction of travel) of the UE. Doppler based GNSS measurements may be affected by multipath such as ground reflections of SV signals resulting in measurement inaccuracies. Measurement inaccuracies may detrimentally impact speed determination, position determination, determination of the distance travelled by a UE, and/or other position or navigation functions on the UE.

SUMMARY

In some embodiments, a method on a user equipment (UE) may comprise: obtaining, one or more Global Navigation Satellite System (GNSS) Doppler measurements and one or more corresponding GNSS pseudorange measurements for one or more satellites; determining one or more GNSS Doppler estimates corresponding to the one or more GNSS Doppler measurements, wherein for a GNSS Doppler measurement, a corresponding GNSS Doppler estimate is determined based, in part, on the GNSS Doppler measurement and a GNSS pseudorange measurement corresponding to the GNSS Doppler measurement; and determining a speed of the UE based, at least in part, on the one or more GNSS Doppler estimates.

In another aspect, a User Equipment (UE) may comprise: a transceiver capable of receiving Global Navigation Satellite System (GNSS) signals; and a processor coupled to the transceiver. The processor may be configured to: obtain one or more GNSS Doppler measurements and one or more corresponding GNSS pseudorange measurements for one or more satellites; determine one or more GNSS Doppler estimates corresponding to the one or more GNSS Doppler measurements, wherein for a GNSS Doppler measurement, a corresponding GNSS Doppler estimate is determined based, in part, on the GNSS Doppler measurement and a GNSS pseudorange measurement corresponding to the GNSS Doppler measurement; and determine a speed of the UE based, at least in part, on the one or more GNSS Doppler estimates.

In a further aspect, a User Equipment (UE) may comprise: means for obtaining one or more GNSS Doppler measurements and one or more corresponding GNSS pseudorange measurements for one or more satellites; means for determining one or more GNSS Doppler estimates corresponding to the one or more GNSS Doppler measurements, wherein for a GNSS Doppler measurement, a corresponding GNSS Doppler estimate is determined based, in part, on the GNSS Doppler measurement and a GNSS pseudorange measurement corresponding to the GNSS Doppler measurement; and means for determining a speed of the UE based, in part, on the one or more GNSS Doppler estimates.

In some embodiments, a non-transitory computer-readable medium comprising executable instructions to configure a processor on a User Equipment (UE) to: obtain one or more GNSS Doppler measurements and one or more corresponding GNSS pseudorange measurements for one or more satellites; determine one or more GNSS Doppler estimates corresponding to the one or more GNSS Doppler measurements, wherein for a GNSS Doppler measurement, a corresponding GNSS Doppler estimate is determined based, in part, on the GNSS Doppler measurement and a GNSS pseudorange measurement corresponding to the GNSS Doppler measurement; and determine a speed of the UE based, at least in part, on the one or more GNSS Doppler estimates The methods disclosed may be performed by a UE using a combination of GNSS signals, including carrier phase measurements, signals from terrestrial wireless systems (which may use Long Term Evolution (LTE) Positioning Protocol (LPP), LPP extensions (LPPe), or other protocols), Inertial Measurement Units (IMUs), and other sensors.

DETAILED DESCRIPTION

Figure 1:
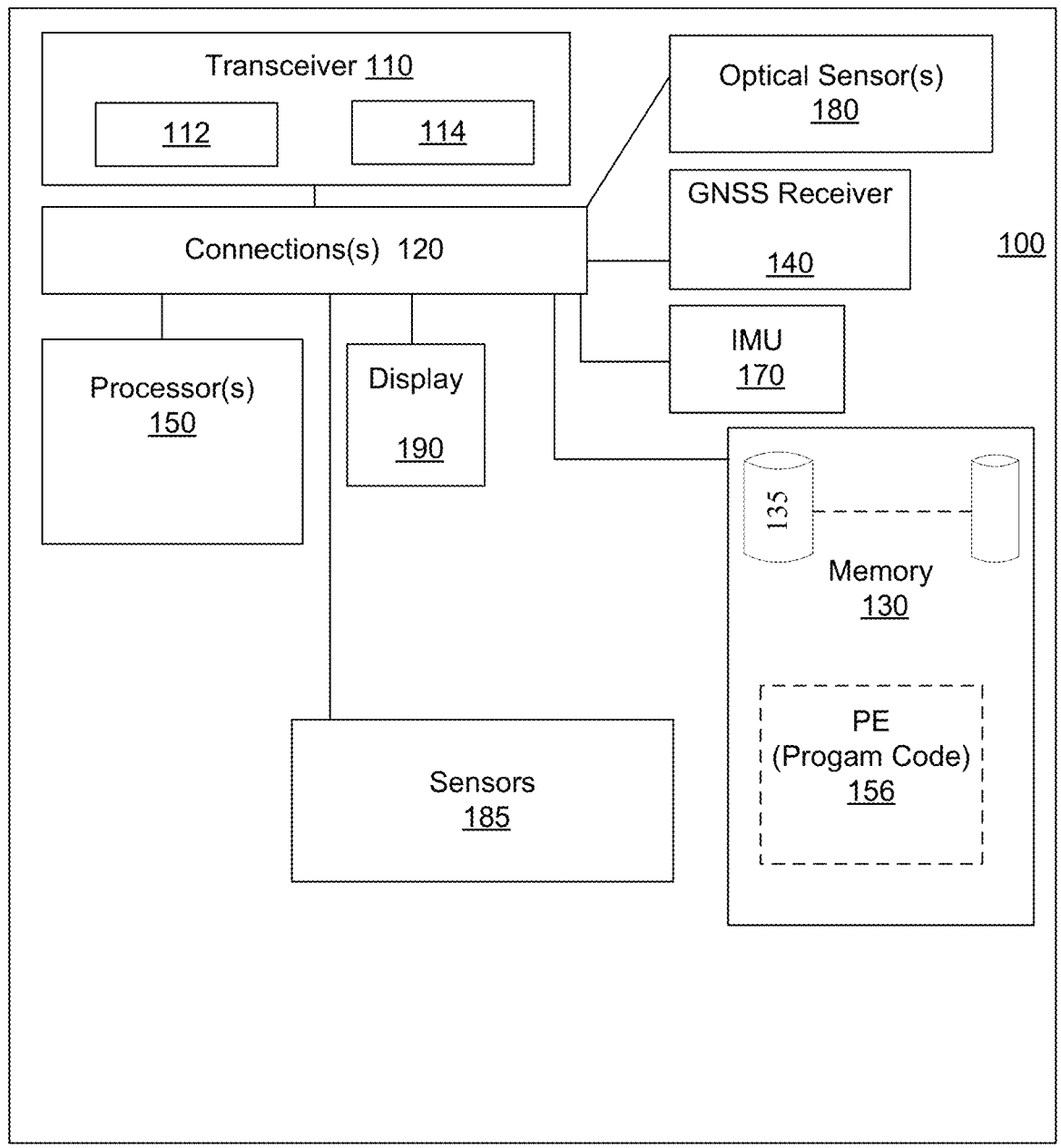
FIG. 1 shows a schematic block diagram illustrating certain exemplary features of a UE enabled to support positioning related measurements according to some disclosed embodiments.

Disclosed embodiments facilitate accuracy and decrease error in terrestrial positioning systems. In some embodiments, errors induced by multipath (e.g. ground reflections) in Doppler based measurements of SVs (e.g. in a satellite positioning system) are mitigated thereby facilitating greater accuracy and improved reliability in positioning related measurements. In some embodiments, disclosed techniques may be applied to the Doppler based measurements to obtain Doppler estimates corresponding to the Doppler based measurements. The Doppler estimates may reduce error and/or improve accuracy of the corresponding Doppler based measurements. For example, the Doppler based measurements may be input along with other parameters to a mathematical model and/or a predictive model. The mathematical model may output a Doppler estimate (e.g. based on statistical techniques) based on the input parameters. The predictive model may be obtained based on machine learning and may predict a Doppler estimate based on the input parameters. The Doppler estimate (e.g. output by the mathematical model and/or the predictive model) may facilitate error reduction and/or improved accuracy in downstream positioning related operations. The term "multipath" is used to refer to errors that occur when a UE receives a mix of direct (Line of Sight) and indirect signals (Non Line of Sight), or indirect-only signals. For example, the indirect signals may arise from ground reflections. The term "positioning related measurements" refers to measurements that may be used to determine position at some time, UE velocity including instantaneous velocity at some time and/or average velocity over some time interval, UE speed, distance travelled over some period, and/or other parameters related to location and/or navigation.

Doppler based measurements make use of the Doppler effect. The Doppler effect pertains to an observed change in frequency of a received signal (e.g. at a receiver) relative to the frequency of the transmitted signal (e.g. by a transmitter) on account of relative motion between the receiver and the transmitter. Doppler measurements may be used to determine range rate between a UE (receiver) and an SV. Range rate pertains to the rate at which the range or distance between the UE and an SV changes over some time period. SVs are in motion even when the UE is stationary. Because the trajectories of SVs can be known, the Doppler shift for signals transmitted by a particular SV is predictable and may be used in UE positioning determination. In instances where the UE is also moving independently (e.g. due to user movement), the Doppler shift may vary from the expected or predicted shift. These variations (relative to a predicted or expected Doppler shift) in Doppler shift for the SV may be used to determine a velocity (speed and direction of travel) of a UE. For example, when the UE is moving, the relationship between the Doppler shift nominally from the satellite and the change (relative to the nominal Doppler shift) based upon the movement of the UE may be used to determine a velocity of the UE.

The terms "User Device" (UD) or "user equipment" (UE) are used interchangeably herein and may refer to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The terms are also intended to include devices which communicate with a personal navigation device (PND), such as by short-range wireless, infrared, wireline connection, or other connection—regardless of whether satellite signal reception, assistance data reception, and/or position-related processing occurs at the device or at the PND. The UE may represent a mobile telephone, notepad computer, or laptop, or it may be a vehicle, or a system in a vehicle, that collects measurement sets for the purpose providing a real time position, motion related information, navigation information, and/or for map creation.

In addition, the terms UD, UE, "mobile station" "mobile device" or "target" are intended to include all devices, including wireless and wireline communication devices, computers, laptops, etc. which are capable of communication with a server, such as via the Internet, Wi-Fi, cellular wireless network, DSL network, packet cable network or other network, and regardless of whether satellite signal reception, assistance data reception, and/or position-related processing occurs at the device, at a server, or at another device associated with the network.

FIG. 1 shows a schematic block diagram illustrating certain exemplary features of UE 100 enabled to support positioning related measurements according to some disclosed embodiments. In some embodiments, the positioning related measurements may include determination of velocity, distance travelled over some time period, motion related parameters, positioning related measurements, etc. In some embodiments, the positioning related measurements may be based on one or more of: GNSS signal measurements, RF signal measurements (e.g. Wireless Local Area Network (WLAN) and/or Wireless Wide Area Network (WWAN) signals), IMU, and/or sensor based measurements in a manner consistent with disclosed embodiments.

UE 100 may, for example, include one or more processor(s) 150, memory 130, a transceiver 110 (e.g., wireless network interface), and Satellite Positioning System (SPS) receiver/GNSS receiver 140 (hereinafter "GNSS receiver 140") optical sensors (OS) 180, Inertial Measurement Unit (IMU) 170, sensors 185, and display 190, which may be operatively coupled to each other with one or more connections 120 (e.g., buses, lines, fibers, links, etc.). In certain example implementations, all or part of UE 100 may take the form of a chipset, and/or the like. In some embodiments, UE 100 may include an onboard oscillator and/or clock (not shown in FIG. 1), which may be used (e.g. by processor(s) 150) to measure elapsed time between events. In some embodiments, UE 100 may include one or more UE antennas (not shown) which may be internal or external. UE antennas may be used to transmit and/or receive signals processed by transceiver 110 and/or GNSS receiver 140.

GNSS receiver 140 may be enabled to receive signals associated with one or more SPS/GNSS resources. Received SPS/GNSS signals may be stored in memory 130 and/or used by processor(s) 150 to determine a position of UE 100 or derive other positioning related measurements. In some embodiments, GNSS receiver 140 may include a code phase receiver and a carrier phase receiver, which may measure carrier wave related information. The carrier wave, which typically has a much higher frequency than the pseudo random noise (PRN) (code phase) sequence that it carries, may facilitate more accurate position determination and/or positioning related measurements. The term "code phase measurements" refer to measurements using a Coarse Acquisition (C/A) code receiver, which uses the information contained in the PRN sequence to calculate the position of UE 100. The term "carrier phase measurements" refer to measurements using a carrier phase receiver, which uses the carrier signal to calculate positions. The carrier signal may take the form, for example for GPS, of the signal L1 at 1575.42 MHz (which carries both a status message and a pseudo-random code for timing) and the L2 signal at 1227.60 MHz (which carries a more precise military pseudo-random code).

In some embodiments, UE 100 may determine its velocity based, in part, on GNSS Doppler measurements (e.g. based on signals received by GNSS Receiver 140), which may make use of the Doppler effect. The Doppler effect pertains to an observed change in frequency of a received signal (e.g. at a receiver) relative to the frequency of the transmitted signal (e.g. by a transmitter) on account of relative motion between the receiver and the transmitter. Because the trajectories of SVs can be known, the Doppler shift for signals transmitted by a particular SV is predictable and may be used in UE position determination and/or for positioning related measurements. If UE100 is also moving independently (e.g. due to user movement), the Doppler shift may vary from the expected or predicted shift. These variations (relative to a predicted or expected Doppler shift) in Doppler shift for the SV may be used to determine a velocity (speed and direction of travel) of a UE. For example, Doppler measurements may be used to determine range rate between a UE (receiver) and an SV. Range rate pertains to the rate at which the range or distance between the UE and an SV changes over some time period. To estimate the range rate, a UE may average the change in range (or delta range) by integrating the Doppler measurements over a short time period (e.g. 0.1$s$) and then dividing it by the duration of the integration interval to obtain an integrated Doppler measurement over time.

GNSS Doppler measurements refer to both carrier phase derived Doppler measurements and/or receiver generated Doppler measurements (e.g. by GNSS receiver 140 on UE 100). Both carrier phase derived Doppler measurements, and/or receiver generated Doppler measurements (e.g. based on the nominally constant reference frequency generated by GNSS receiver 140 on UE 100) may be used to determine velocity. Receiver generated GNSS Doppler measurements may be used to determine (nearly) instantaneous velocity and typically occur over relatively short time intervals. Carrier phase derived Doppler measurements may be used to determine average velocity between two measurement epochs. The carrier phase derived Doppler measurement is typically computed over a longer time span, which results in smoother Doppler measurements. The term measurement epoch refers to an instant in time when a measurement is made by a receiver. The measurement interval or time interval between measurements determines the measurement epoch rate or epoch rate. In some embodiments, the carrier phase derived Doppler measurement may be obtained by differencing carrier-phase observations in the time domain.

In some embodiments, UE 100 may also receive reference time transmissions (e.g. GNSS time such as Global Positioning System (GPS) time, or coordinate universal time) from a Wireless Wide Area Network (WWAN) (e.g. in a System Information Block (SIB)), or a Wireless Local Area Network (WLAN), which may be used to maintain and/or correct time information (e.g. based on the onboard oscillator/clock) maintained by UE 100. In some embodiments, UE 100 may measure received signals including signal strength, signal time of arrival, signal phase, signal frequency, and the raw measurements may be processed by processor(s) 150. For example, a signal received from an SV may be analyzed and processed to determine variations in Doppler frequency shift relative to a nominal or expected Doppler frequency shift for the satellite. In some embodiments, UE 100 and/or processor(s) 150 may, determine Doppler estimates corresponding to the Doppler measurements. The Doppler estimates may reduce error and/or improve accuracy of the corresponding Doppler measurements. For example, the Doppler based measurements may be input along with other parameters to a mathematical model and/or a predictive model. The mathematical model may output a Doppler estimate (e.g. based on statistical techniques) based on the input parameters. The predictive model may be obtained based on machine learning and may predict a Doppler estimate based on the input parameters. The Doppler estimate (e.g. output by the mathematical model and/or the predictive model) may facilitate error reduction and/or improved accuracy in other positioning related calculations (e.g. velocity determination, distance travelled, etc.).

Transceiver 110 may, for example, include a transmitter 112 enabled to transmit one or more signals over one or more types of wireless communication networks and a receiver 114 to receive one or more signals transmitted over one or more types of wireless communication networks. Wireless communication networks may include, for example, WWANs, including cellular networks, and/or Local Area Networks (LANs), and/or WLANs and/or Wireless Personal Area Networks (WPANs). A local area network (LAN) may be an Institute of Electrical and Electronics Engineers (IEEE) 802.3x network, for example. A WLAN may be an IEEE 802.11x network. A WPAN may be a Bluetooth network, an IEEE 802.15x, or some other type of network. The techniques may also be implemented in conjunction with any combination of WWAN, WLAN, and/or WPAN.

In some embodiments, UE 100 may also include Inertial Measurement Unit (IMU) 170. In some embodiments, IMU 170, which may comprise 3-axis accelerometer(s), 3-axis gyroscope(s), and/or magnetometer(s), may provide velocity, orientation, and/or other position related information to processor(s) 150. The magnetometer may be capable of measuring the intensity and/or the direction of the Earth's magnetic field and may serve as a compass and/or provide an indication of a direction of travel of UE 100. In some embodiments, the output of IMU 170 may be used, in part, by processor(s) 150 to determine a position and orientation of UE 100.

In some embodiments, UE 100 may also optionally or additionally include sensors 185, which may include one or more of: an altimeter, a barometer, ultrasonic sensors, depth sensors, etc. In some embodiments, sensors 185 may include a magnetometer. Sensors 185 may provide inputs to processor(s) 150 to facilitate positioning related functions. For example, measurements by the altimeter may be used to provide an indication of altitude above a calibrated level, while the measurements by the barometer may provide an indication of atmospheric pressure, which may also be used to obtain a determination of altitude. In general, the list of sensors above in not exhaustive and sensors 185 may include various other sensor types that are increasingly being incorporated into UEs 100.

In some embodiments, UE 100 may comprise OS 180, which may include CCD or CMOS sensors and/or camera(s) 180. In some embodiments, OS 180 may include or be coupled to a LIDAR unit/lasers with associated instrumentation including scanners, photo-detectors and receiver electronics. OS 180 may convert optical images or signals into an electronic or digital images and may send captured images to processor(s) 150. For example, in some embodiments, OS 180 may be housed separately, and may be operationally coupled to display 190, processor(s) 150 and/or other functional units in UE 100.

Processor(s) 150 may be implemented using a combination of hardware, firmware, and software. For example, software code such as Positioning Engine (PE) 156 (hereinafter PE 156) may be stored in a computer-readable medium, which may form part of memory 130. PE 156 may include functionality that facilitates use of information derived from one or more of: wireless measurements (e.g. GNSS measurements), and/or images captured by OS 180, measurements by IMU 170 and/or sensors 185, either independently, or in conjunction with received location assistance data to determine a position, a position uncertainty estimate for UE 100 and/or to determine other positioning-related measurements (e.g. velocity, distance travelled, etc.). Processor(s) 150 may be implemented using some combination of software, firmware, and/or dedicated circuitry, such as Application Specific Integrated Circuits (ASICs), Digital Signal Processors (DSPs), and/or dedicated processors. In some embodiments, processor(s) 150 may perform some, or all, of the positioning related functions described in relation to FIGS. 4-6 below.

For a hardware implementation, the processor(s) 150 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. For a firmware and/or software implementation, the methodologies may be implemented using program code, procedures, functions, and so on that perform the functions described herein. Any machine-readable medium tangibly embodying instructions may be used in implementing the methodologies described herein. For example, software or program code (e.g. PE 156) may be stored in a computer-readable medium which may form part of memory 130 coupled to processor(s) 150. The program code (e.g. PE 156) may be read and executed by processor(s) 150.

Memory 130 may represent any data storage mechanism. Memory may be implemented within the processor(s) 150 or external to the processor(s) 150. As used herein, the term "memory" refers to any type of long term, short term, volatile, nonvolatile, or other memory and is not to be limited to any particular type of memory or number of memories, or type of media upon which memory is stored. Memory 130 may include, for example, a primary memory and/or a secondary memory. Primary memory may include, for example, a random access memory, read only memory, etc. While illustrated in this example as being separate from processor(s) 150, it should be understood that all or part of a primary memory may be provided within or otherwise co-located/coupled with processor(s) 150. Secondary memory may include, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to a computer-readable medium. As such, in certain example implementations, the methods and/or apparatuses presented herein may take the form in whole or part of a computer-readable medium that may include computer implementable instructions (such as PE 156) stored thereon, which if executed by at least one processor(s) 150 may be operatively enabled to perform all or portions of the example operations as described herein.

In some embodiments, memory 130 may hold program code (e.g. PE 156) and/or data to facilitate accuracy and error mitigation in Doppler based GNSS measurements, UE velocity determination, distance determination, navigation and position determination related functions performed by processor(s) 150. For example, memory 160 may hold one or more of: almanac/ephemeris data for SVs, mathematical models and/or predictive models to determine Doppler estimates based, in part, on Doppler based GNSS measurements and/or to facilitate error mitigation and improved accuracy in Doppler based GNSS measurements, data provided by IMU 170 and/or sensors 185, captured still images, and/or program results, etc.

Computer-readable media may include physical computer storage media. A storage medium may be any available medium that can be accessed by a computer. By way of example, and not limitation, such non-transitory computer-readable media can comprise RAM, ROM, EEPROM, CD-ROM, flash memory, or other optical disk storage, magnetic disk storage or other magnetic storage devices, or any other medium that can be used to store desired program code in the form of instructions and/or data and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. Computer readable medium 160 may be a part of memory 130.

In addition, in some instances, instructions and/or data may be provided as signals in a communication apparatus. For example, a communication apparatus may include a transceiver 110, which may receive signals through receiver 112 indicative of instructions and data. The instructions and data may cause one or more processors to implement functions outlined herein.

Further, UE 100 may include a screen or display 190 capable of rendering color images, including 3D images. In some embodiments, display 190 may be used to display live images captured by camera(s) 180, Graphical User Interfaces (GUIs), program output, etc. In some embodiments, display 190 may comprise and/or be housed with a touchscreen to permit users to input data via some combination of virtual keyboards, icons, menus, or other Graphical User Interfaces (GUIs), user gestures and/or input devices such as a stylus and other writing implements. In some embodiments, display 190 may be implemented using a Liquid Crystal Display (LCD) display or a Light Emitting Diode (LED) display, such as an Organic LED (OLED) display. In other embodiments, display 190 may be housed separately and may be operationally coupled to camera 180, processor(s) 150, and/or other functional units in UE 100.

Figure 2:
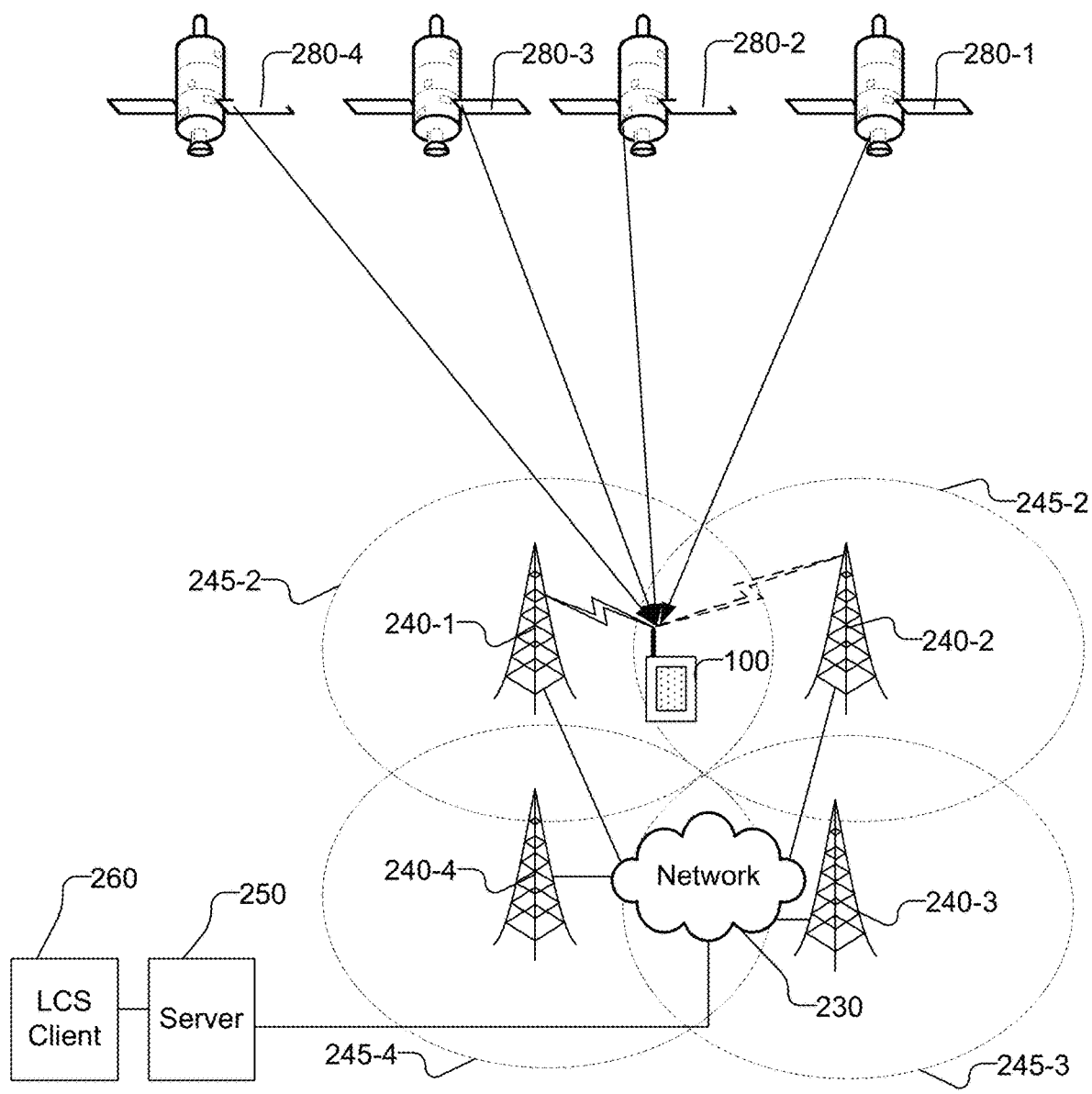
FIG. 2 shows an architecture of a system capable of providing positioning related services to UEs 100 in a manner consistent with embodiments disclosed herein.

FIG. 2 shows an architecture of a system 200 capable of providing positioning related services to UEs 100 in a manner consistent with embodiments disclosed herein. In some embodiments, system 200 may be used to transfer of location assistance data such as updated almanac or ephemeris data for one or more GNSS SVs 280 to the UEs 100. For example, in some instances, based on the received location assistance data UE 100 may obtain GNSS satellite measurements, which may be used locally by UE 100 to determine its velocity, etc.

As illustrated in FIG. 2, the UE 100 may communicate with server 250 through network 230 and base station antennas 240-1-240-4, collectively referred to as antennas 240, which may be associated with network 230. Server 250 may, in some instances, provide the functionality of one or more of a location server, location assistance server, position determination entity (PDE), or another network entity. The transfer of the location and other information may occur at a rate appropriate to both UE 100 and server 250.

In some embodiments, system 100 may use messages such as LPP or LPPe messages between UE 100 and server 250. The LPP Protocol is well-known and described in various publicly available technical specifications from an organization known as the 3rd Generation Partnership Project (3GPP). LPPe has been defined by the Open Mobile Alliance (OMA) and may be used in combination with LPP such that each combined LPP/LPPe message would be an LPP message comprising an embedded LPPe message.

In some embodiments, UE 100 may receive location assistance information such as almanac/ephemeris data for one or more SVs 280 from base station antennas 240, which may be used for position determination. Antennas 240 may form part of a wireless communication network, which may be a WWAN, WLAN, etc. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on.

A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from an organization known as the "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network. The techniques may also be implemented in conjunction with any combination of WWAN, WLAN, etc. For example, antennas 240 and network 230 may form part of, e.g., an evolved UMTS Terrestrial Radio Access Network (E-UTRAN) (LTE) network, a W-CDMA UTRAN network, a GSM/EDGE Radio Access Network (GERAN), a 1xRTT network, an Evolution-Data Optimized (EvDO) network, a WiMax network or a WLAN. In some embodiments, UE 100 may receive reference time such as GNSS time from SIBs transmitted by base stations coupled to antennas 240.

UE 100 may also receive signals from one or more Earth orbiting Space Vehicles (SVs) 280 such as SVs 280-1, 280-2, 280-3, and/or 280-4 (hereinafter referred to as "SVs 280"), which may be part of a GNSS. SVs 280, for example, may be in a GNSS constellation such as the US Global Positioning System (GPS), the European Galileo system, the Russian Glonass system, or the Chinese Compass system. In accordance with certain aspects, the techniques presented herein are not restricted to global satellite systems. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS/GNSS may include any combination of one or more global and/or regional navigation satellite systems and/or augmentation systems, and SPS/GNSS signals may include SPS, SPS-like, and/or other signals associated with such one or more SPS/GNSS. The SPS/GNSS may also include other non-navigation dedicated satellite systems such as Iridium or OneWeb. In some embodiments, GNSS receiver 140 may be configured to receive signals from one or more of the above SPS/GNSS/satellite systems.

For simplicity, only one UE 100, server 250, and four SVs 280 are shown in FIG. 2. In general, system 100 may comprise multiple cells indicated by 245-$k$ ($0 \leq k \leq N_{cells}$, where $N_{cells}$ is the number of cells) with additional networks 230, LCS clients 260, UDs 100, servers 250, (base station) antennas 240, and SVs 280. System 100 may further comprise a mix of cells including microcells and femtocells in a manner consistent with embodiments disclosed herein.

UE 100 may be capable of wirelessly communicating with server 250 through one or more networks 230 that support positioning and location services to obtain an initial coarse location, which may be used in conjunction with almanac/ephemeris information for positioning related measurements as described further herein. For example, UE 100 may use GNSS Doppler based velocity determination and compute its instantaneous velocity at a time, or an average velocity over a time interval, and/or distance traveled over some time interval, and/or other positioning-related parameters based on GNSS measurements. In some embodiments, UE 100 may use GNSS positioning (e.g. based on pseudorange measurements) to estimate a first position at the beginning of a time interval and a second position at the end of the time interval and determine distance traveled based on the difference between the first and second positions. Other positioning-related parameters such as velocity, for example, may be obtained based on the distance traveled and the length of the time interval.

In some embodiments, GNSS measurements may be augmented with measurements from one or more of: IMU 170, Sensors 185, measurements of WWAN/WLAN signals, and/or information received over WWAN/WLAN networks. As one example, GNSS measurements (e.g. obtained by UE 100) over some time interval may be adjusted or otherwise modified to determine corresponding GNSS estimates. For example, the GNSS estimates (which may reflect corrections, adjustments, or modifications to GNSS measurements) may be based on measurements from IMU 170 and/or sensors 186 and/or signals from WWAN/WLAN networks, and/or other parameters over that time interval. The parameters may be input to a model (e.g. mathematical and/or predictive), which may output GNSS estimates. As another example, IMU 170 and/or sensors 186 and/or signals from WWAN/WLAN networks may be used to obtain independent estimates of position, distance travelled by UE over some time interval, velocity, and/or other positioning-related parameters. In some embodiments, measurements from IMU 170 and/or sensors 186 and/or signals from WWAN/WLAN networks may be used to obtain estimates of positioning related parameters when GNSS measurements are affected by environmental conditions and/or unavailable over some time period.

In some embodiments, UE 100 may determine a position (e.g. latitude, longitude) based on one or more of: GNSS measurements, IMU measurements, sensor measurements, WWAN signal measurements, WLAN signal measurements, or some combination thereof. For example, when four SVs 280 are visible, UE 100 may be able to determine its location in 3-dimensions (3D) (e.g. latitude, longitude, and altitude). In some embodiments, UE 100 may use Positioning Reference Signals (PRS) provided by Base Stations (BS) coupled to antennas 240 along with the known locations of the antennas to determine its position. In some embodiments, UE 100 may use methods such as Advanced Forward Link Trilateration (AFLT) using known locations of transmitters (WWAN or WLAN) to determine its position. In some embodiments, the position of UE 100 may be determined and/or augmented using measurements from IMU 170 and/or sensors 185.

In some embodiments, UE 100 may determine its velocity based on GNSS Doppler measurements. GNSS Doppler measurements refer to both carrier phase derived Doppler measurements and/or receiver generated Doppler measurements (e.g. by GNSS receiver 140 on UE 100). For example, carrier phase derived Doppler measurements, or receiver generated Doppler measurements (e.g. based on the nominally constant reference frequency generated by GNSS receiver 140 on UE 100) may be used to determine velocity. In some embodiments, GNSS estimates (e.g. as output by a mathematical model and/or a predictive model) corresponding to the GNSS Doppler measurements may be used to determine positioning related measurements including velocity, distance traveled, etc.

Figure 3:
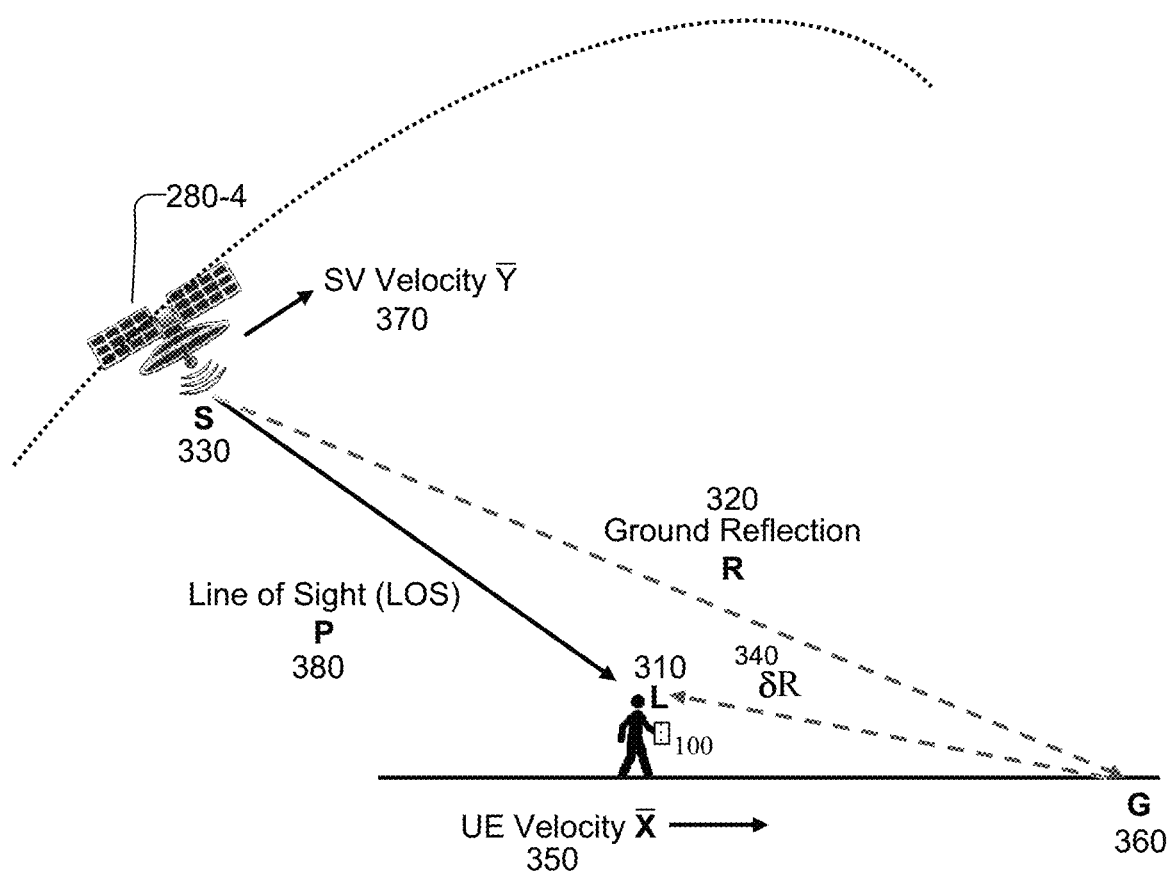
FIG. 3 illustrates multipath effects on SV measurements for example SV 280-4 by UE 100 at a point in time.

FIG. 3 illustrates multipath effects on SV measurements for example SV 280-4 by UE 100 at a point in time. As shown in FIG. 3, UE 100 may be located at point L 310 at a time t. UE 100 may be moving at UE velocity $\overline{X}$ 350 relative to a frame of reference. The magnitude of $\overline{X}=\|\overline{X}\|$ speed of UE 100 may be expressed, for example, in meters per second or other appropriate units. Signals from SV 280-4, which may be at location S 330 at time t and moving at velocity $\overline{Y}$ 370 may be received at UE 100. The magnitude of $\overline{Y}=\|\overline{Y}\|$ or speed of SV 280-4 may be expressed, for example, in meters per second or other appropriate units. The signals received by UE 100 may include Line of Sight (LOS) signals received directly from SV 280-4, which follow path P=SL, and multipath signals (e.g. from ground reflection), reflected at point G 360, which follow path SG and GL For LOS GNSS signals (e.g. from SV 280-4), UE velocity 350 may result in change in GNSS Doppler measurements relative to an expected or nominal Doppler frequency. The change in GNSS Doppler measurements may be positive or negative depending on direction of motion of UE 100 relative to SV 280-4. Multipath from ground reflections of the signal from SV 280-4 may result in a lower GNSS Doppler measurement change being observed at UE 100 (relative to that observed from a LOS signal from SV 280-4 without multipath). Thus, the accuracy and reliability of velocity and other positioning related measurements that are based on GNSS Doppler measurements may be detrimentally impacted. For example, when multipath from ground reflections is present, distance traveled computations based on integrated speed from GNSS Doppler measurements may be statistically lower when compared to the actual or true distance traveled by UE 100.

In FIG. 3, the LOS path from point L 310 (where UE 100 is located at time t) to point S 330 (where SV is located at time t) is indicated as LOS pseudorange P 380. Accordingly, the Doppler based LOS measurement for SV 280-4, $D_{LOS}$OS, is a function of the directional cosine of Y and X. The directional cosine refers to the cosine of the angle between two vectors (e.g. Y and X above). The term pseudorange refers to an estimated distance (also termed a pseudo distance) between an SV (e.g. such as one SVs 280) and a UE (e.g. UE 100). The term pseudorange is used because errors in time measurements that are used to calculate the range may affect range determination. By determining the ranges to at least four satellites and their respective positions, a UE may determine its own position at some given time. Satellite positions at a given time may be determined based on knowledge of satellite orbital parameters. The pseudorange for a satellite may be obtained by multiplying the speed of light by the estimated time for the signal from the satellite to reach the receiver.

In FIG. 3, the Non LOS (NLOS) path to UE 100 consists of the path R 360 from point S 330 to point G 360 and the path δR (from point G 360 to point L 310). The NLOS pseudorange may be written as NLOS pseudorange=R+δR. Accordingly, the Doppler based NLOS measurement for SV 280-4, $D_{NLOS}$, is a function of the directional cosine Y and (X δxy), where δxy is a function of δR. Thus, $D_{NLOS}<D_{Los}$, while, the NLOS pseudorange, R+δR >P (the LOS pseudorange). Consequently, as outlined above, multipath from ground reflections may result in inaccuracies in position related measurements such as UE velocity, distance traveled, etc.

Accordingly, some disclosed embodiments facilitate error mitigation and improved accuracy in terrestrial positioning systems. For example, errors induced by multipath (e.g. ground reflections) in Doppler based measurements from satellite positioning systems may be mitigated thereby facilitating greater accuracy and improved reliability. In some embodiments, statistical techniques and/or machine learning techniques may be used to mitigate error arising from multipath (e.g. ground reflections). In some embodiments, the methods may comprise an offline phase, where statistical techniques (e.g. linear regression, least squares, etc.) are used to determine relationships between GNSS Doppler measurements and truth/reference measurements and obtain a mathematical model. In some embodiments, during operation (e.g. following mathematical model creation) GNSS Doppler measurements (e.g. as measured by UE 100) and/or IMU measurements and/or sensor measurements and/or other parameters may be input to the mathematical model, which may output corresponding GNSS estimates (corresponding to the GNSS Doppler measurements) and/or a corrected velocity of UE 100 (based, in part, on the input data). In some embodiments, the GNSS measurements may be output by a Kalman filter (e.g. which may form part of processor(s) 150 and/or use functionality provided by processor(s) 150 on UE 100), and the Kalman filtered GNSS measurements may be input to the predictive model and/or mathematical model. For example, one or more of: sensor measurements, IMU measurements, wireless measurements, GNSS environmental parameters, etc. may be input to the mathematical model and/or predictive model, which may output corresponding GNSS estimates. In some embodiments, the GNSS estimates may be used to determine velocity, distance traveled, and/or other positioning related parameters.

In some embodiments, the offline phase may use machine learning techniques (e.g. multivariable linear regression with gradient descent, iterative dichotomization, etc.) based, in part, on one or more of: GNSS Doppler measurements, and/or other measurements (e.g. IMU/sensor), and/or input parameters, and truth/reference measurements to obtain a predictive model. The term "machine learning" refers to techniques that may be used to determine patterns in input data streams and make predictions related to some desired output. During the learning phase, machine learning techniques may analyze captured input data (e.g. measured data such as GNSS Doppler measurements, IMU measurements and/or sensor measurements and/or other parameters (e.g. environmental) related to the measurements and true/reference data (e.g. true/reference velocity, true/reference GNSS Doppler measurement) to obtain a predictive model. Thus, for example, a training dataset may comprise measurements by UE 100 (e.g. one or more of: GNSS Doppler measurements, measurements by IMU 170, various positioning related sensor measurements from sensors 185), environmental parameters (e.g. signal quality, number of SVs 280, etc.) and truth reference measurements (e.g. true velocity, true distance traveled, etc.), which may be obtained by other techniques and/or sources. During the learning phase, relationships between: (a) measurements by UE 100 (e.g. one or more of the: GNSS Doppler measurements, and/or IMU measurements, and/or sensor measurements), other parameters; and (b) the truth/reference measurements (e.g. true velocity, true distance travelled, etc.) may be determined to create a predictive model.

In some embodiments, predictive model may comprise auto regressive (AR) models such as an AR(N) model, which may predict a next/subsequent value based on asset of N previous observations. Predictive model may also take the form of one or more of: Fully Connected Neural Networks (FCN), Convolutional Neural Networks (CNN), Recurrent Neural Networks (RNN) such as Long Short Term Memory (LSTM) or Gated Recurrent Units (GRU), and/or some hybrid of the above networks. Because AR models may dynamically adjust the predictions based on the past N number of observations, seasonality and general input signal bias may be incorporated in prediction models. AR based prediction models facilitate prediction in embedded platforms (e.g. as a functional unit and/or application in UE 100, which may take the form of a mobile device or other device that may have limited support for parallel processing or neural processing engines).

In some embodiments, the Convolutional Neural Networks may be used to map the input signals to lower dimensional representations, which may then be filtered by Kalman filters resulting in a backpropagated Kalman filter. In a backpropagated Kalman filter, the state-space model represented by the Kalman Filter may be used to stabilize the predictions from the noisy input, while model parameters are autonomously tuned using backpropagation techniques for neural networks. Some approaches to backpropagating Kalman filters are described in "Backprop KF: Learning Discriminative Deterministic State Estimators," T. Haarnoja, A. Ajay, S. Levine, and P. Abbeel, 30th Conference on Neural Information Processing Systems (NIPS 2016), Barcelona, Spain, 2016, which is hereby incorporated by reference in its entirety.

In some embodiments, hybrid neural networks may use CNNs at the input layer, which may facilitate automatic generation of useful features/parameters for prediction; next, a RNN layer may facilitate learning of the time-dimension structure of the signals based on the CNN-generated representations; and a CNN/FCN networks at the output layer may facilitate mapping the output of the RNN layer to the desired output format.

Machine learning algorithms (e.g. used by predictive model) may also include boosting techniques, where a plurality of weak learners are combined to form strong learners of the input signal space. Boosted machine learning techniques may include Adaptive Boosting (AdaBoost) and techniques for gradient boosted decision trees such as XGBoost and Light GBM. In Light GBM, for example, inputs with small gradients are excluded and mutually exclusive features are bundled so that predictions are facilitated with a smaller data size. In some embodiments, Light GBMs may be used, for example, when predictive models are deployed with embedded systems (e.g. as a functional unit and/or application in UE 100, which may take the form of a mobile device or other device with memory and/or processing constraints). For example, Light GBM based predictive models may facilitate predictions (e.g. Doppler estimates, velocity, distance traveled, etc.) with smaller number of weights, thus reducing the required memory and computing power needed for inference in embedded systems. In some embodiments, off the shelf or library based Light GBM implementations may be used (e.g. from the Distributed Machine Learning Toolkit (DMTK)).

Machine learning techniques may also include semi-supervised learning methods involving Generative Adversarial Networks (GANs) where a dataset without truth information is combined with a dataset with truth information. In GANs, modeling is based on interaction between two networks: (i) a generator network that may generate synthetic data based on a noise source, and (ii) a discriminator network that discriminates between the output of the generator and truth data. Semi-supervised learning may use unlabeled data along with labeled data during learning. For example, GANs facilitate learning even in situations where a majority of the dataset can be unlabeled. Thus, the structure of the dataset may be learnt and used to develop a predictive model. For example, GANs may be trained using Doppler measurements, truth data, and one or more of: GNSS environmental parameters, sensor measurements, IMU measurements, wireless measurements, and/or other unlabeled parameters that may affect measurement to obtain a predictive model. In some embodiments, machine learning platforms such as Keras, Tensorflow, PyTorch etc. may be used for implementing and training GANs.

The distance metric between an actual distribution (e.g. truth data) and a predicted distribution during the learning phase (e.g. based on the input GNSS, sensor, wireless data) may be used to determine a critic (or witness function), which maximally discriminates between samples from the two distributions. The critic function may be determined by a neural network and may replace the discriminator in the GAN. In a Wasserstein GAN, the distance metric is based on the so-called "earth-Mover distance," which reflects the minimum cost of transporting mass in order to transform the predicted distribution into the actual distribution, where cost is measured as the mass times transport (or transformation) distance. In some embodiments, an Actor-Critic method GAN using Wasserstein GAN with Gradient Penalty may be used to obtain a predictive model.

Machine learning may use a set of assumptions to determine model selection. The set of assumptions is referred to as an "inductive bias" of the machine learning technique. For example, a "restriction bias" (a type of inductive bias) may constrain the set of models used during the learning phase, while a "preference bias" (another type of inductive bias) results in some models being preferred over others during the learning phase. For example, multivariable linear regression with gradient descent uses: (a) a restriction bias, so that only prediction models based on a linear combination of the input parameter values are considered; and (b) a preference bias over the order of the linear models considered by using a gradient descent approach to determine weights. As another example, iterative dichotomization may use: (a) a restriction bias by only considering tree prediction models where each branch encodes a sequence of checks on individual input parameters; and (b) a preference bias by favoring less complex trees over larger trees.

In some embodiments, during operation (e.g. following predictive model creation) GNSS Doppler measurements (e.g. as measured by UE 100) and/or IMU measurements and/or sensor measurements and/or other parameters may be input to the predictive model, which may output: predicted GNSS Doppler estimates corresponding to the input data and/or a predicted velocity of UE 100. For example, during operation (e.g. following predictive model creation) GNSS Doppler measurements (e.g. as measured by UE 100) may be input to the predictive model, which may output: predicted GNSS Doppler estimates based, in part, on the GNSS Doppler measurements. For example, the predictive model may use patterns in the input data (e.g. collected during the learning phase) to determine values of predicted GNSS Doppler estimates and/or a predicted velocity of UE 100 and/or a predicted distance traveled and/or other positioning related parameters. The term "prediction" as used herein refers to the assignment of a value to a variable. For example, a value may be assigned to one or more of: a GNSS Doppler parameter, a velocity, a distance traveled, and/or a positioning related parameter, which may be output by the predictive model based on the input measurements/parameters.

Figure 4A:
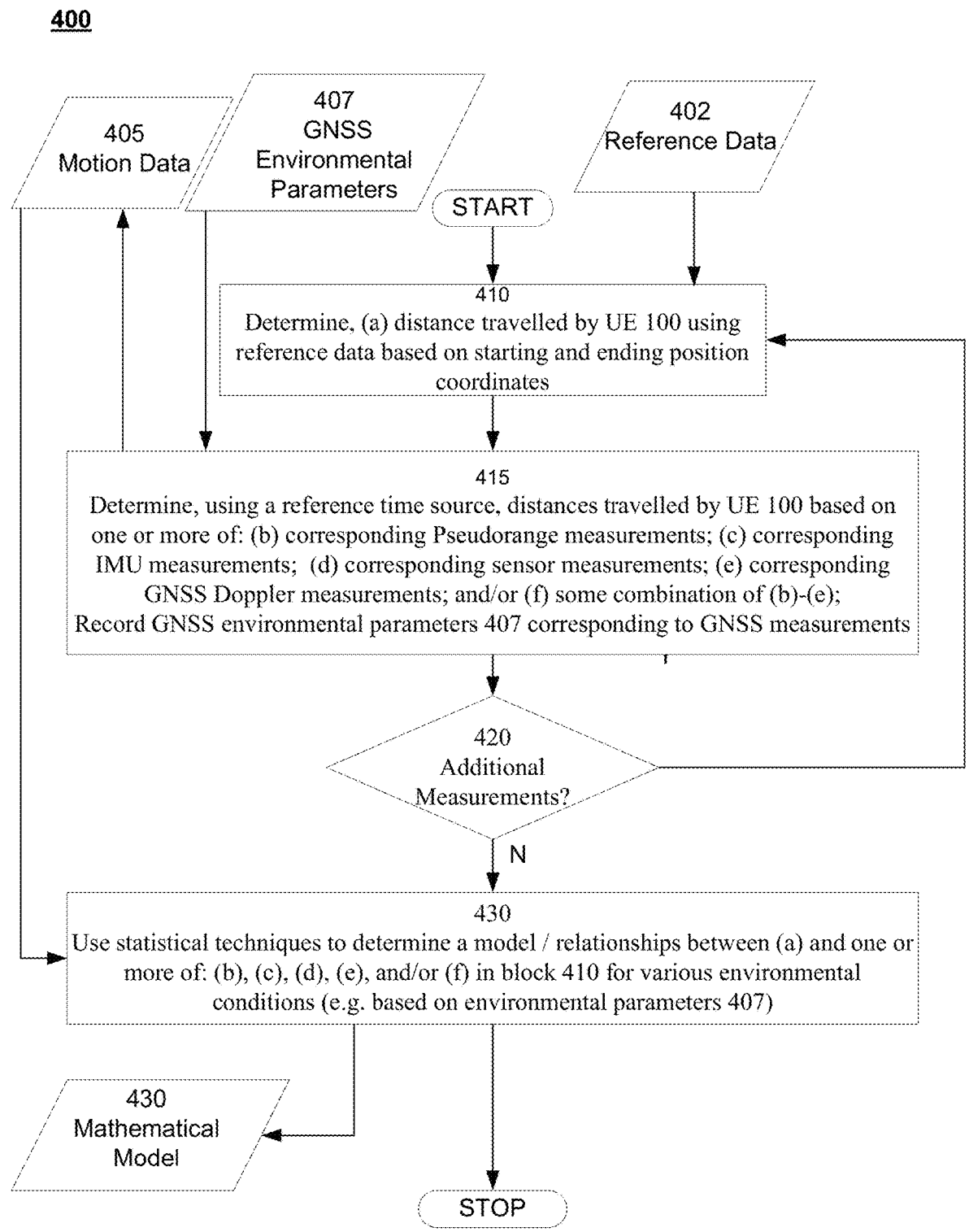
FIG. 4A shows an exemplary method for determining a mathematical model that correlates UE distance traveled based on reference data with one or more of: corresponding GNSS pseudorange measurements, corresponding GNSS Doppler measurements, corresponding GNSS environmental parameters, and/or corresponding IMU/sensor measurements.

FIG. 4A shows an exemplary method 400 for determining a mathematical model 430 that correlates UE distance travelled based on reference data with one or more of: corresponding pseudorange measurements, corresponding IMU measurements, corresponding sensor measurements, and/or corresponding GNSS Doppler measurements. In some embodiments, the correlation may be based further on GNSS environmental parameters 407 present at the time of measurement. For example, in one embodiment, a mathematical model 430 may be determined by correlating measured GNSS Doppler data with distance traveled using truth or reference data. In some embodiments, mathematical model 430 may be based further on GNSS environmental parameters 407 present at the time of measurement. In some embodiments, method 400 may be performed by processor(s) 150 and/or PE 156 on UE 100. In some embodiments, method 400 may be performed during an offline mathematical model generation phase.

In some embodiments, in block 410, (a) the distance travelled by UE 100 (e.g. between points P1 and P2) may be determined using a reference data. For example, known coordinates of the starting position (e.g. P1) and ending position (e.g. P2) of UE 100 may be used to determine the distance travelled. In some embodiments, reference data 402, which may provide a true/reference distance between the start and end points (e.g. P1 and P2) may be used. In some embodiments, reference data 402 may be obtained by determining the distance travelled by UE 100 using any accurate distance computation technique. For example, the known coordinates (e.g. latitude, longitude, and/or altitude) of P1 and P2 may be used to determine the distance travelled by UE 100.

In some embodiments, in block 415, using a reference time source, distances traveled by UE 100 based on one or more of: (b) corresponding pseudorange measurements, and/or (c) corresponding IMU measurements, and/or (d) corresponding sensor measurements, and/or (e) corresponding GNSS Doppler measurements, and/or (f) some combination of (b)-(e), may be determined. Further, in some embodiments, corresponding GNSS environmental parameters 407 associated with the measurements may be obtained and recorded. In some embodiments, the measurements in (b)-(f) above and GNSS environmental parameters 407 may be stored as motion data 405.

For example, (e.g. in (e) above) the distance traveled by UE 100 may be determined based on GNSS Doppler measurements. For example, (e.g. for (e) above) the velocity of UE 100 may be determined based on GNSS Doppler measurements, and the distance traveled may be computed as the product of the speed (magnitude of the velocity) and $\Delta T$ (based on the reference time source). As another example, (e.g. for (b) above) pseudorange measurements to SVs 280 may be used to determine the distance traveled by UE 100 between a point P1 and another point P2, during a time interval $\Delta T$. As a further example, the distance traveled by UE 100 may be determined based on a combination of measurements including one or more of GNSS measurements, measurements by IMU 170 and/or sensors 185, IMU 170, and/or wireless (e.g. WWAN, and/or WLAN measurements), etc.

In some embodiments, one or more GNSS environmental parameters 407 may be input to block 415. GNSS environmental parameters 407 may be obtained, determined, and/or measured by UE 100 based on received GNSS signals. GNSS environmental parameters 407 may include SV fix related parameters, such as the number of satellites visible, dilution of precision (DOP), and other environmental conditions that may be obtained, determined and/or measured. The term "dilution of precision" relates to the effect of navigation satellite geometry on positional measurement precision. In some embodiments, GNSS environmental parameters 407 may include one or more of: GNSS timestamps (e.g. GPS Week/Sec), and/or the GNSS fix parameters (e.g. Latitude, Longitude, Altitude), and/or GNSS fix uncertainty (e.g. Horizontal Error Position Estimate, Horizontal Error Position Estimate Uncertainty, Altitude Uncertainty), and/or GNSS statistics (e.g. number of GPS/Glonass/Beidou satellites used, time between fixes (in seconds)), and/or GNSS derived factors (e.g. GNSS Heading, GNSS Heading Uncertainty, Horizontal Error Velocity Estimate, Horizontal Speed, Positional Dilution of Precision (PDOP), Horizontal Dilution of Precision (HDOP), Vertical Dilution of Precision (VDOP)), and/or the location source/fix type (e.g. whether GNSS Only, GNSS and Sensor Assisted, Sensor Based). In some embodiments, some GNSS environmental parameters (e.g. SV fix related parameters) may be provided to UE 100 as assistance data (e.g. via a WWAN/WLAN). The term Dilution of Precision (DOP) refers to the effect of satellite geometry on positional measurement precision. DOP may be expressed in terms of HDOP, VDOP, and PDOP, which may be determined based on the positions of satellites (e.g. SVs 280 in FIG. 2). In some embodiments, the positions of SVs 280 may be known and DOP values may be determined (e.g. by UE 100 and/or processor(s) 150) based on the known positions of SVs 280.

In some embodiments, in block 420, it may be determined if additional measurements are to be obtained. For example, based on performance and other parameters related to the mathematical model, it is determined that additional measurements are to be obtained ("Y" in block 420), then, the block 410 may be invoked. In some embodiments, method 400 may iterate through blocks 410, 415, and 420 until a statistically significant number of measurements has been obtained.

If no further measurements are to be obtained ("N" in block 420), then, in block 430, statistical techniques may be to determine a mathematical model 430 based on statistical relationships between (a) and one or more of: (b)-(f) in block 415 for various fix conditions (e.g. based on GNSS environmental parameters 407). In some embodiments, mathematical model 430 may be determined using regression analysis, curve fitting and/or other statistical modeling techniques. In some embodiments, mathematical model may be based on statistical relationships between: (a) the true or reference distance, on one hand, and one or more of: (b) corresponding Pseudorange measurements; and/or (c) corresponding IMU measurements; and/or (d) corresponding sensor measurements; and/or (e) corresponding GNSS Doppler measurements; and/or (f) some combination of (b)-(e) under various fix conditions (e.g. as represented by GNSS environmental parameters 407).

For example, in some embodiments, a Scale Factor (K) may be determined from the plurality of measurements in motion data 402. The scale factor K may form a part of mathematical model 430. For example, from the measurements in motion data 402, a scale factor may be determined as a function of K=f ($D_{Ref}$, where $D_{pseudorange}$, $D_{Doppler}$), where $D_{psuedoorange}$ is the pseudorange based distance measurement, $D_{Ref}$ is the reference distance, and $D_{Doppler}$ is the distance determined based on GNSS Doppler measurements. In some embodiments, multiple scale factors may be computed based on the type of sensor(s) used, and/or the availability or use of sensor measurements (e.g. IMU 170, WLAN/WWAN based positioning measurements etc.). For example, a first scale factor may be computed for instances when only GNSS pseudorange and GNSS Doppler measurements are available (without sensor measurements) and a second scale factor may be computed for instances where measurements from sensors 185 and/or IMU 170 are available (in addition to the GNSS pseudorange and GNSS Doppler measurements). In some embodiments, the mathematical model may also be used to facilitate the correction of sensor only measurements i.e. when no GNSS measurements are available. As one example, the scale factor may be computed as the ratio of the difference between $D_{Ref}$ and $D_{Doppler}$ to the difference between $D_{pseudorange}$ and $D_{Doppler}$, so that $$K = \frac{D_{Ref} - D_{Doppler}}{D_{pseudorange} - D_{Doppler}}.$$

The equation above is merely one example and various other functions may be used to determine K.

Figure 4B:
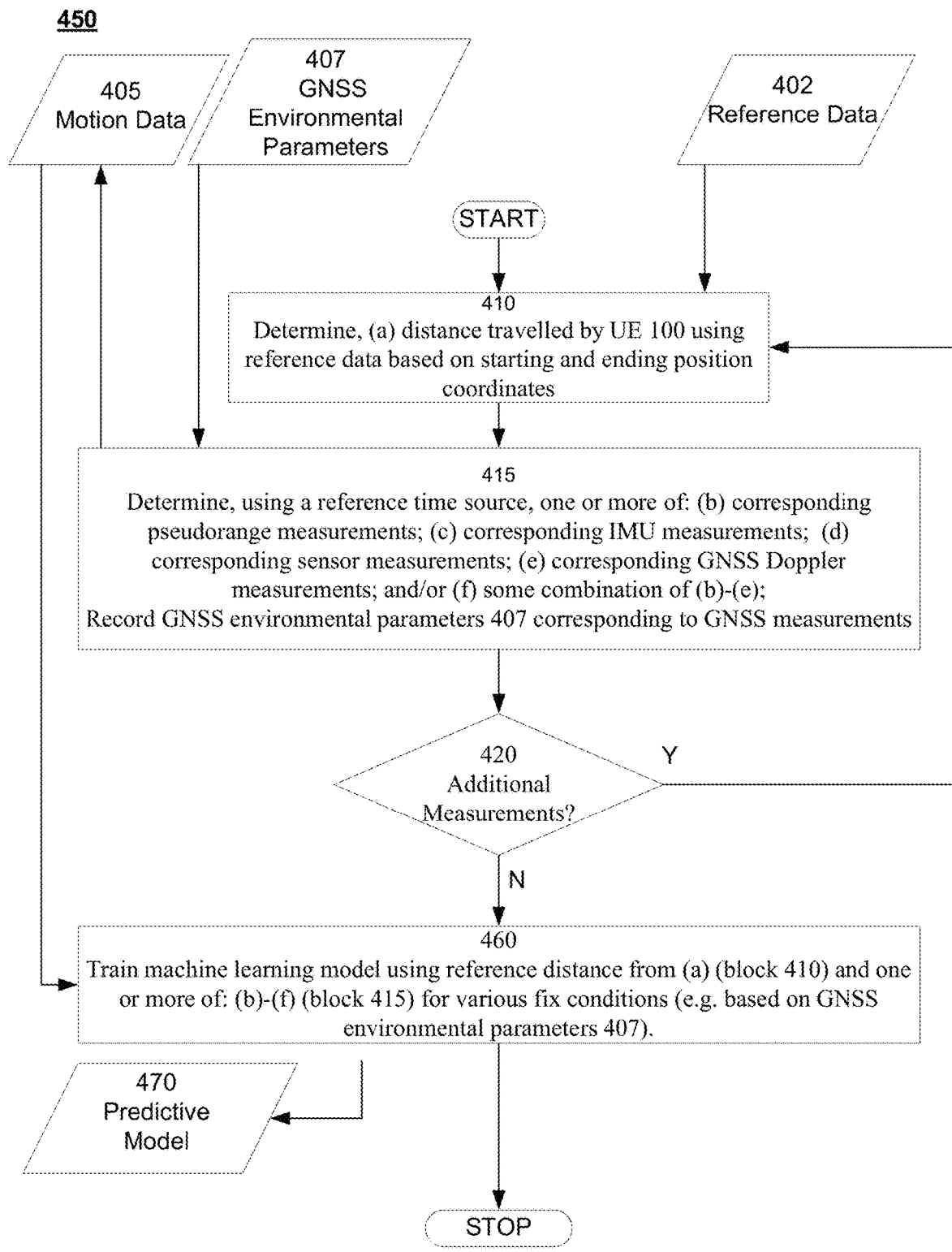
FIG. 4B shows an exemplary method for determining a predictive model using UE distance traveled based on reference data and one or more of: corresponding GNSS pseudorange measurements, corresponding GNSS Doppler measurements, corresponding GNSS environmental parameters, and/or corresponding IMU/sensor measurements.

FIG. 4B shows an exemplary method 450 for determining a predictive model 470 using UE distance traveled based on reference data and one or more of: corresponding pseudorange measurements, corresponding IMU measurements, corresponding sensor measurements, corresponding GNSS Doppler measurements, and/or corresponding GNSS environmental parameters 407. In some embodiments, method 450 may be performed by processor(s) 150 and/or PE 156 on UE 100. In some embodiments, method 450 may be performed during an offline model generation phase.

In some embodiments, in block 410, (a) the distance travelled by UE 100 (e.g. between points P1 and P2) may be determined using a reference data. For example, known coordinates of the starting position (e.g. P1) and ending position (e.g. P2) of UE 100 may be used to determine the distance travelled. In some embodiments, reference data 402, which may provide a true/reference distance between the start and end points (e.g. P1 and P2) may be used. In some embodiments, reference data 402 may be obtained by determining the distance travelled by UE 100 using any accurate distance computation technique. For example, the known coordinates (e.g. latitude, longitude, and/or altitude) of P1 and P2 may be used to determine the distance travelled by UE 100.

In some embodiments, in block 415, using a reference time source, one or more of: (b) corresponding pseudorange measurements, and/or (c) corresponding IMU measurements, and/or (d) corresponding sensor measurements, and/or (e) corresponding GNSS Doppler measurements, and/or (f) some combination of (b)-(e), may be determined. Further, in some embodiments, corresponding GNSS environmental parameters 407 associated with the measurements may be obtained and recorded. In some embodiments, the measurements in (b)-(f) above and GNSS environmental parameters 407 may be stored as motion data 405. In some embodiments, one or more derived measurements may be determined based on the raw measurements and recorded as motion data 405. For example, a velocity of UE 100 may be determined based on the corresponding GNSS Doppler measurements (e.g. obtained in (e) above) over some time interval. The velocity of UE 100 may be stored as part of motion data 405.

In some embodiments, one or more GNSS environmental parameters 407 may be input to block 415. GNSS environmental parameters 407 may be obtained, determined, and/or measured by UE 100 based on received GNSS signals. GNSS environmental parameters 407 may include SV fix related parameters, such as the number of satellites visible, dilution of precision (DOP), and other environmental conditions that may be obtained, determined and/or measured. The term "dilution of precision" relates to the effect of navigation satellite geometry on positional measurement precision. In some embodiments, GNSS environmental parameters 407 may include one or more of: GNSS timestamps (e.g. GPS Week/Sec), and/or the GNSS fix parameters (e.g. Latitude, Longitude, Altitude), and/or GNSS fix uncertainty (e.g. Horizontal Error Position Estimate, Horizontal Error Position Estimate Uncertainty, Altitude Uncertainty), and/or GNSS statistics (e.g. number of GPS/Glonass/Beidou satellites used, time between fixes (in seconds)), and/or GNSS derived factors (e.g. GNSS Heading, GNSS Heading Uncertainty, Horizontal Error Velocity Estimate, Horizontal Speed, Positional Dilution of Precision (PDOP), Horizontal Dilution of Precision (HDOP), Vertical Dilution of Precision (VDOP)), and/or the location source/ fix type (e.g. whether GNSS Only, GNSS and Sensor Assisted, Sensor Based). In some embodiments, some GNSS environmental parameters (e.g. SV fix related parameters) may be provided to UE 100 as assistance data (e.g. via a WWAN/WLAN).

In some embodiments, in block 420, it may be determined if additional measurements are to be obtained. For example, based on performance, accuracy, and other parameters related to the predictive model, if it is determined that additional measurements are to be obtained ("Y" in block 420), then, block 410 may be invoked.

In some embodiments, method 400 may iterate through blocks 410, 415, and 420 until a significant number of measurements (e.g. adequate to determine predictive model with the specified performance/accuracy parameters) have been obtained.

If no further measurements are to be obtained ("N" in block 420), then, in block 430, then machine learning techniques may be used using motion data 405 as the training dataset to determine a predictive model 470. In some embodiments, the machine learning techniques may comprise multivariable linear regression with gradient descent, iterative dichotomization, etc. Machine learning may use a set of assumptions to determine model selection. The set of assumptions is referred to as an "inductive bias" of the machine learning technique. For example, a "restriction bias" (a type of inductive bias) may constrain the set of models used during the learning phase, while a "preference bias" (another type of inductive bias) results in some models being preferred over others during the learning phase. For example, multivariable linear regression with gradient descent uses: (a) a restriction bias, so that only prediction models based on a linear combination of the input parameter values are considered; and (b) a preference bias over the order of the linear models considered by using a gradient descent approach to determine weights. As another example, iterative dichotomization may use: (a) a restriction bias by only considering tree prediction models where each branch encodes a sequence of checks on individual input parameters; and (b) a preference bias by favoring less complex trees over larger trees. For example, a predictive model based on the light GBM method, which generates boosted tree models with relatively smaller number of nodes may be used. In some embodiments, any of the machine learning models described above may be used. For example, one or more of: AR, CNN, Kalman backpropagation, RNN, FCN, hybrid neural networks, GANs, boosting techniques, etc. may be used to determine predictive model 470. In some embodiments, the machine learning techniques may use motion data 405 (e.g. one or more of: GNSS Doppler measurements, and/or IMU measurements and/or sensor measurements, and/or GNSS environmental parameters 407) and corresponding truth/reference measurements 402 to obtain predictive model 470.

In some embodiments, the machine learning techniques may determine patterns in input data streams to obtain predictive model 470. During the learning phase, machine learning techniques may analyze reference data 402 and one or more of: GNSS Doppler measurements, and/or IMU measurements and/or sensor measurements and/or GNSS environmental parameters 407 related to the measurements to obtain predictive model 470. During the learning phase, relationships between: (a) measurements by UE 100 (e.g. one or more of the: GNSS pseudorange measurements, and/or GNSS Doppler measurements, and/or IMU measurements, and/or sensor measurements), GNSS environmental parameters 407; and (b) the reference measurements 402 may be determined to create predictive model 470. In some embodiments, DMTK based tools may be used, in part, to determine predictive model.

In some embodiments, motion data 405 may be normalized, randomized, and otherwise pre-processed prior to training. In some embodiments, the pre-processed motion data may be split into training data, (which is used to train the model to recognize relationships between $D_{Pseudorange}$, $D_{Ref}$ and $D_{Doppler}$) and testing data (which is used to test model predictions based on its training). The model iterates through the training and testing steps, until the predictions (e.g. based on $D_{Doppler}$) closely match $D_{Ref}$. For example, the training may be complete when the predicted value of $D_{Ref}$ matches an actual value of $D_{Ref}$ within some threshold, and when the match occurs for a very high percentage of predictions (within some threshold of 100%). As another example, the training may be complete when the predicted value of speed (or predicted magnitude of the velocity of UE 100) matches a reference speed of UE 100 (or reference magnitude of velocity) within some threshold, and when the match occurs for a very high percentage of predictions (within some threshold of 100%).

In some embodiments, machine learning may also use GNSS Environmental parameters 407 along with motion data during training so that predictive model may be trained to predict a Doppler measurement and/or speed for a variety of GNSS environmental conditions. In some embodiments, after training, predictive model 470 may predict an instantaneous UE speed based on current GNSS Doppler and other measurements. The total distance travelled may be computed as sum of the instantaneous predicted speeds multiplied by corresponding time intervals over which the speed is valid. In some embodiments, machine learning techniques that may be used to determine predictive model 470 may comprise: Linear Regression, and/or Generalized Additive Models (GAMs), and/or Recursive Neural Networks, or variants thereof.

GAMs relate a response or dependent variable (e.g. a reference Doppler measurement) to some predictor variables, (e.g. GNSS Doppler measurement, environmental factors, etc.).

GAMs determine a predictive model (e.g. predictive model 470) based on assumption that the relationships between (or (e.g. functions relating) the individual predictor variables and the response variable follow smooth patterns (linear or nonlinear); and that these functions may be estimated based on the data and used to predict the response variable.

A recursive neural network may determine a predictive model (e.g. predictive model 470) based on machine learning by processing data from structured domains (e.g. (e.g. GNSS Doppler measurements, pseudoranges, sensor input, environmental factors, etc.). Recursive neural networks may be used to determine predictive models for regression problems. During learning, for example, the flow of information in recursive neural networks may be bidirectional resulting in a sequential propagation of information from node(s) toward leaves and from leaves toward node(s) where the message passing results in determination of a predictive model (or an inference system) that learns hidden dependencies explicitly encoded within structural patterns used during the training phase of the recursive neural networks. During operation, recursive neural networks may apply the same set of weights recursively over a structured input, to produce a structured prediction over variable-size input structures, or a scalar prediction on it, by traversing a given structure in topological order (also termed a topological sort). Recursive neural networks may include Recurrent Neural Networks (RNNs), may combine a previous time step and a hidden representation into the representation for a current time step. In some embodiments, RNNs may include Long Short Term Memory (LSTM) and Phased LSTM (PLSTM). LSTM refers to a building unit for layers of an RNN, facilitate memory or remembrance of values over arbitrary time intervals. LSTMs may include a cell (responsible for the memory), an input gate, output gate, and a "forget" gate with connections between these gates and the cell. The gates may use an activation function to compute an activation of a weighted sum thereby regulating the flow of values through LSTM connections. Phased LSTMs include an additional time gate, which updates the memory cell only when the gate is open, where the opening and closing (oscillation frequency) of the gate are controlled by parameters. PSLTMs facilitate machine learning and prediction in situations where input from a plurality of sensors may need integration but, where the sensors have distinct sampling rates (e.g. short or long sampling frequencies). PSLTNs facilitate determination and use of prediction models in instances where RNN inputs are sampled at asynchronous times. In some embodiments, predictive model 470 may be used (e.g. during a subsequent operational phase) to predict a GNSS Doppler measurement or a UE velocity based on input measurements and GNSS environmental parameters.

Figure 5A:
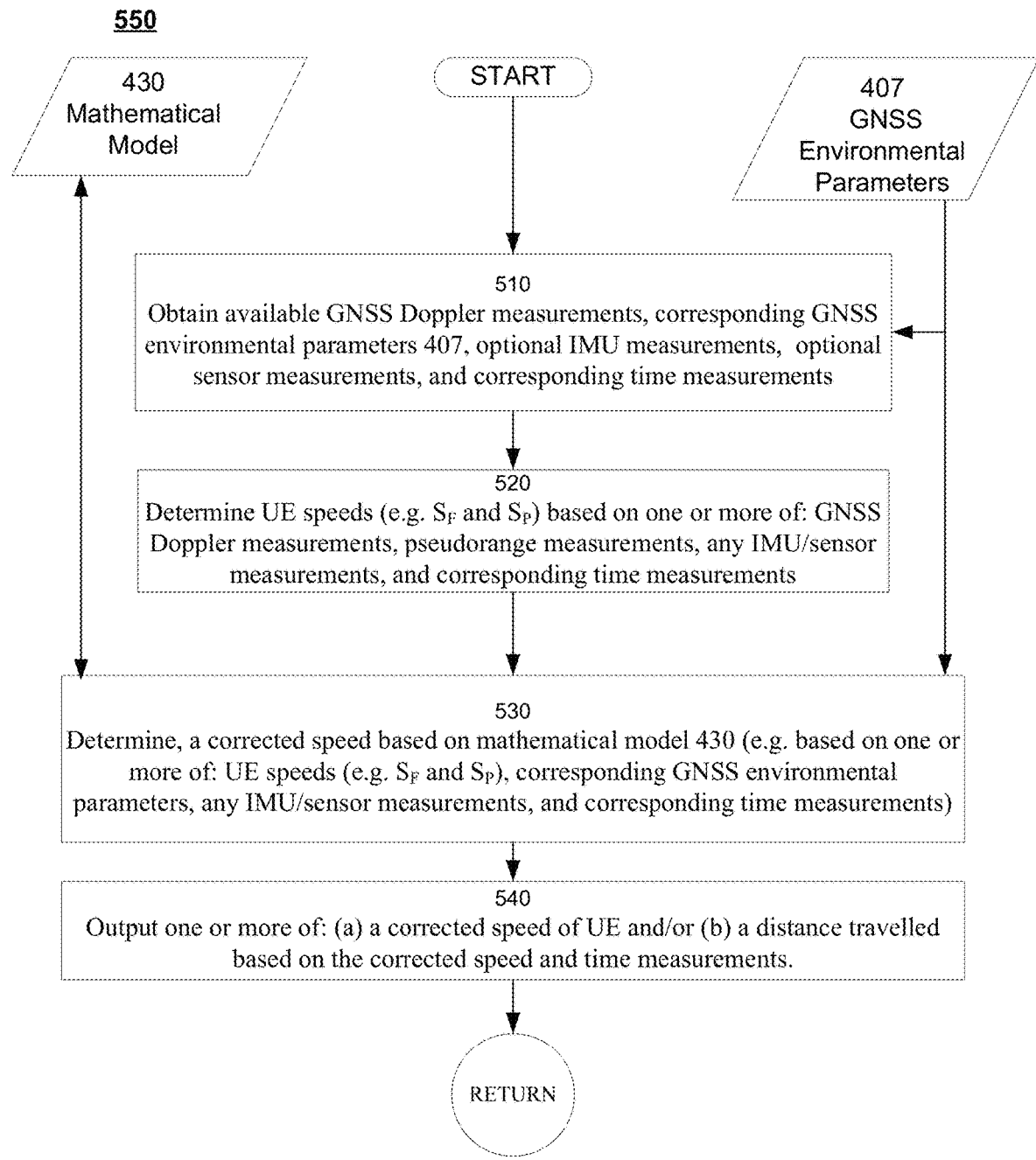

FIG. 5A shows a flowchart for a method 500 to determine a corrected UE speed based on mathematical model 430. In some embodiments, method 500 may be performed by UE 100 and/or processor(s) 150 and/or PE 156 on UE 100. Method 500 may be performed to mitigate measurement error when determining one or more position related parameters. In some embodiments, method 500 may be triggered by a positioning application and/or a navigation related application, which may include functionality for speed determination and/or to determine distance travelled.

In block 510, GNSS pseudorange measurements, GNSS Doppler measurements, time measurements, and one or more GNSS environmental parameters 407 may be obtained. In some embodiments, a reference time source may be used for time measurements. In some embodiments, one or more GNSS environmental parameters may be obtained (e.g. as assistance data) from a WWAN and/or WLAN to which UE 100 may be communicatively coupled.

In block 520, a first (e.g. raw) UE speed, SF, may be determined based, in part, on the GNSS Doppler and time measurements. Further, a second speed, $S_P$, may be determined based, in part, on pseudorange measurements over the time interval. As outlined above, $S_F$ and $S_P$ may be detrimentally affected by multipath (e.g. ground reflections). In some embodiments, $S_F$ and $S_P$ may be optionally augmented with speed based on IMU measurements (e.g. from IMU 170) and/or sensor measurements (e.g. from sensors 185). In some instances, for example, when no GNSS measurements are available, measurements from IMU 170 and/or sensors 185 and/or positioning measurements based on WWAN or WLAN signals may be used to estimate speed of UE 100 over the time interval.

In block 530, a corrected speed, SC, may be determined using mathematical model 430. In some embodiments, in block 530, mathematical model 430 may determine the corrected speed, Sc, based on one or more of: first UE speed $S_F$ (e.g. based on GNSS Doppler measurements), second speed $S_P$, (e.g. based on GNSS pseudorange measurements) time measurements, and/or GNSS environmental parameters 407.

In some embodiments, the corrected speed, $S_C$, may be determined based on a scale factor K as $S_C=g(S_P,S_F,K)$, where $S_C$ is the corrected speed, and g is a function of $S_P,S_F$, and K, where $S_P$ is the speed determined based on pseudorange measurements, and $S_F$ is the first speed. The scale factor K may depend on environmental parameters at the time of measurement. In some embodiments, the function g may be based on a function f that was used to determine K when determining mathematical model 430 (e.g. during the phase depicted in FIG. 4A)

As one example, the corrected speed, $S_C$, may be determined as a sum of the first speed ($S_F$) and a product of the scale factor (K) and the difference between the first speed ($S_F$) and the speed determined based on pseudorange measurements ($S_P$) so that $S_C=((S_P-S_F)*K)+S_F$. The preceding equation is merely one example and various other functions may be used to determine $S_C$.

In some embodiments, the scale factor K may be adjusted based on GNSS environmental parameters 407 such as one or more of: the number of SVs 280 used for measurements; and/or whether only GNSS measurements were used/available (e.g. without measurements by IMU 170 and/or measurements by sensors 185) and/or whether the GNSS measurements were augmented with measurements by IMU 170 and/or measurements by sensors 185; and/or whether only measurements by IMU 170 and/or measurements by sensors 185 were used (e.g. when no GNSS measurements were available).

For example, if the number of SVs used in not less than N and only GNSS measurements were used (without measurements from sensors 185 or IMU 170), a scale factor $K=K_1$ may be used, whereas if the number of SVs used in less than N and GNSS measurements were used along with measurements from sensors 185 and/or IMU 170, a scale factor $K=K_2$ may be used. In some embodiments, a scale factor $K=K_3$ may be used, when no GNSS measurements are available and only measurements from sensors 185 and/or measurements from IMU 170 and/or WWAN/WLAN measurements were used to make the initial determinations of speed (e.g. in block 520).

GNSS environmental parameters 407 may include SV fix related parameters, such as the number of satellites visible, dilution of precision (DOP), and other environmental conditions that may be obtained, determined and/or measured. The term "dilution of precision" relates to the effect of navigation satellite geometry on positional measurement precision. In some embodiments, GNSS environmental parameters 407 may include one or more of: GNSS timestamps (e.g. GPS Week/Sec), and/or the GNSS fix parameters (e.g. Latitude, Longitude, Altitude), and/or GNSS fix uncertainty (e.g. Horizontal Error Position Estimate, Horizontal Error Position Estimate Uncertainty, Altitude Uncertainty), and/or GNSS statistics (e.g. number of GPS/Glonass/Beidou satellites used, time between fixes (in seconds)), and/or GNSS derived factors (e.g. GNSS Heading, GNSS Heading Uncertainty, Horizontal Error Velocity Estimate, Horizontal Speed, Positional Dilution of Precision (PDOP), Horizontal Dilution of Precision (HDOP), Vertical Dilution of Precision (VDOP)), and/or the location source/fix type (e.g. whether GNSS Only, GNSS and Sensor Assisted, Sensor Based). In some embodiments, some GNSS environmental parameters (e.g. SV fix related parameters) may be provided to UE 100 as assistance data (e.g. via a WWAN/WLAN).

In block 540, one or more of: the corrected speed, $S_C$, of UE 100; a position of UE 100 based on $S_C$; a distance travelled by UE 100 based on the corrected speed, $S_C$, and time measurements, may be output (e.g. to the calling routine or application on UE 100). In some embodiments, the output may be displayed to the user and/or may be output audibly (e.g. through a speaker on UE 100).

Figure 5B:
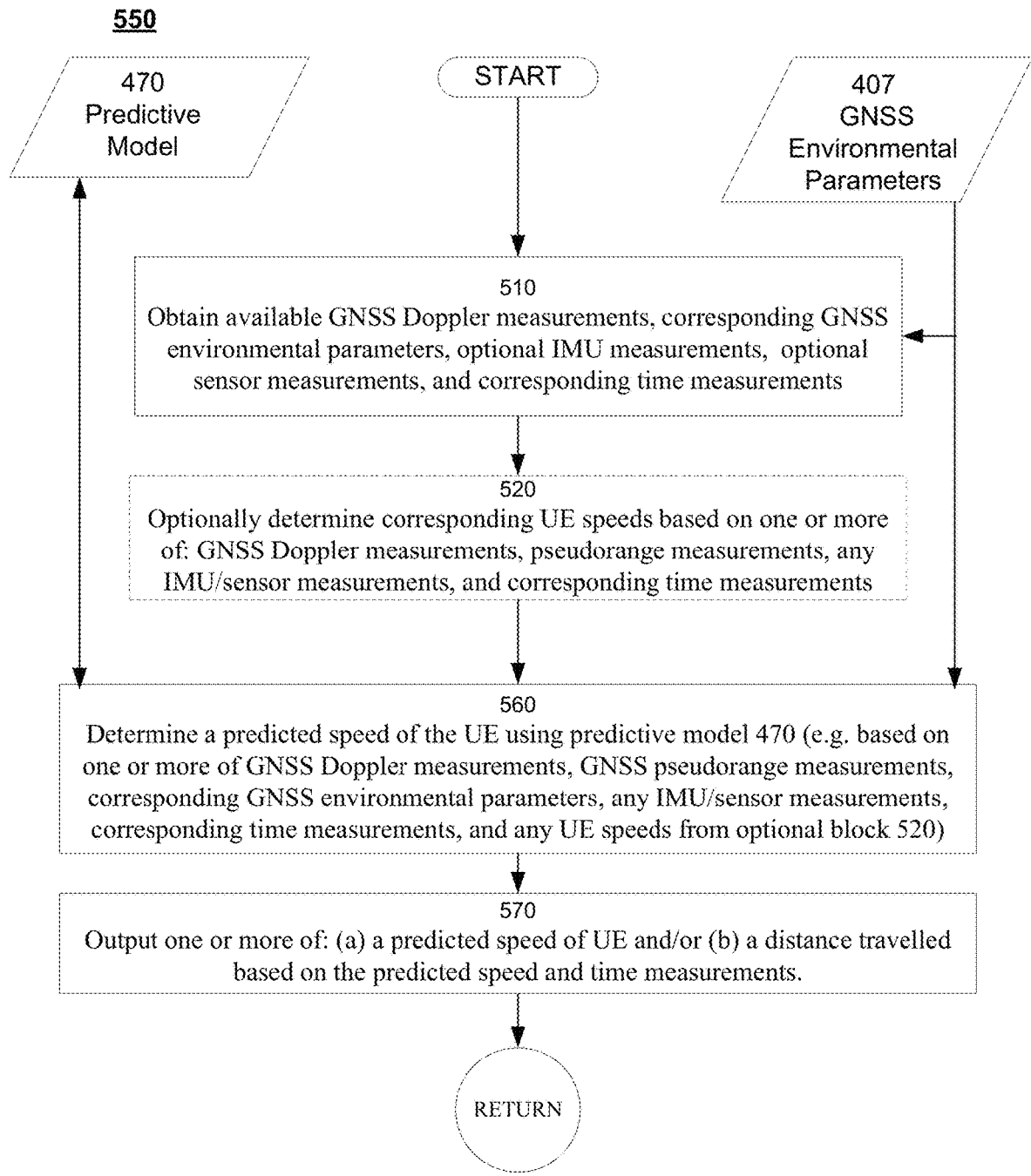

FIG. 5B shows a flowchart for a method 550 to determine a predicted UE speed based on predictive model 470. In some embodiments, method 550 may be performed by UE 100 and/or processor(s) 150 and/or PE 156 on UE 100. Method 550 may be performed to mitigate measurement error when determining one or more position related parameters. In some embodiments, method 500 may be triggered by a positioning application and/or a navigation related application, which may include functionality for speed determination and/or to determine distance travelled.

In block 510, GNSS pseudorange measurements, GNSS Doppler measurements, time measurements, and GNSS environmental parameters 407 may be obtained. In some embodiments, a reference time source may be used for time measurements. In some embodiments, one or more GNSS environmental parameters may be obtained (e.g. as assistance data) from a WWAN and/or WLAN to which UE 100 may be communicatively coupled In optional block 520, a first (e.g. raw) UE speed, $S_F$, may be determined (when invoked, or when block 520 forms part of method 550) based, in part, on the GNSS Doppler and time measurements. Further, (in optional block 520) a second speed, $S_P$, may be determined based, in part, on pseudorange measurements over the time interval. As outlined above, $S_F$ and $S_P$ may be detrimentally affected by multipath (e.g. ground reflections). In some embodiments, $S_F$ and $S_P$ may be optionally augmented with speed based on IMU measurements (e.g. from IMU 170) and/or sensor measurements (e.g. from sensors 185). In some instances, for example, when no GNSS measurements are available, measurements from IMU 170 and/or sensors 185 and/or positioning measurements based on WWAN or WLAN signals may be used to estimate speed of UE 100 over the time interval $S_F$, may be determined (when invoked, or when block 520 forms part of method 550) based, in part, on the GNSS Doppler and time measurements. Further, (in optional block 520) a second speed, $S_P$, may be determined based, in part, on pseudorange measurements over the time interval. As outlined above, $S_F$ and $S_P$ may be detrimentally affected by multipath (e.g. ground reflections). In some embodiments, $S_F$ and $S_P$ may be optionally augmented with speed based on IMU measurements (e.g. from IMU 170) and/or sensor measurements (e.g. from sensors 185). In some instances, for example, when no GNSS measurements are available, measurements from IMU 170 and/or sensors 185 and/or positioning measurements based on WWAN or WLAN signals may be used to estimate speed of UE 100 over the time interval.

In block 560, a predicted speed of UE 100, SML, may be determined using predictive model 470. In some embodiments, in block 560, predictive model 470 may determine predicted speed, SML, based on one or more of: GNSS Doppler measurements, GNSS pseudorange measurements, time measurements, and GNSS environmental parameters 407. In some embodiments, in block 560, a predicted speed may be determined based on SF and $S_P$ (e.g. if optional block 520 was performed in FIG. 5B). In some embodiments, any available measurements including one or more of: measurements by IMU 170 and/or measurements by sensors 185 and/or WWAN/WLAN measurements may be used as input to predictive model 470. In some embodiments, predictive model 470, which may be based on machine learning, may accept GNSS Doppler measurements, GNSS pseudorange measurements, time measurements, and/or GNSS environmental parameters 407, and one or more of the measurements (e.g. IMU. sensor, and/or WWAN/WLAN measurements) outlined above as input, and output predicted speed $S_{ML}$.

GNSS environmental parameters 407 may include SV fix related parameters, such as the number of satellites visible, dilution of precision (DOP), and other environmental conditions that may be obtained, determined and/or measured. The term "dilution of precision" relates to the effect of navigation satellite geometry on positional measurement precision. In some embodiments, GNSS environmental parameters 407 may include one or more of: GNSS timestamps (e.g. GPS Week/Sec), and/or the GNSS fix parameters (e.g. Latitude, Longitude, Altitude), and/or GNSS fix uncertainty (e.g. Horizontal Error Position Estimate, Horizontal Error Position Estimate Uncertainty, Altitude Uncertainty), and/or GNSS statistics (e.g. number of GPS/Glonass/Beidou satellites used, time between fixes (in seconds)), and/or GNSS derived factors (e.g. GNSS Heading, GNSS Heading Uncertainty, Horizontal Error Velocity Estimate, Horizontal Speed, Positional Dilution of Precision (PDOP), Horizontal Dilution of Precision (HDOP), Vertical Dilution of Precision (VDOP)), and/or the location source/fix type (e.g. whether GNSS Only, GNSS and Sensor Assisted, Sensor Based). In some embodiments, some GNSS environmental parameters (e.g. SV fix related parameters) may be provided to UE 100 as assistance data (e.g. via a WWAN/WLAN).

In block 570, one or more of: a predicted speed of UE 100, $S_{ML}$, a distance travelled by UE 100 based on the predicted speed, a position of UE 100 based on the predicted speed, and time measurements may be output (e.g. to the calling routine or application on UE 100). In some embodiments, the output may be displayed to the user and/or may be output audibly (e.g. through a speaker on UE 100). In some embodiments, control may then return to a calling routine on UE 100.

Figure 6A:
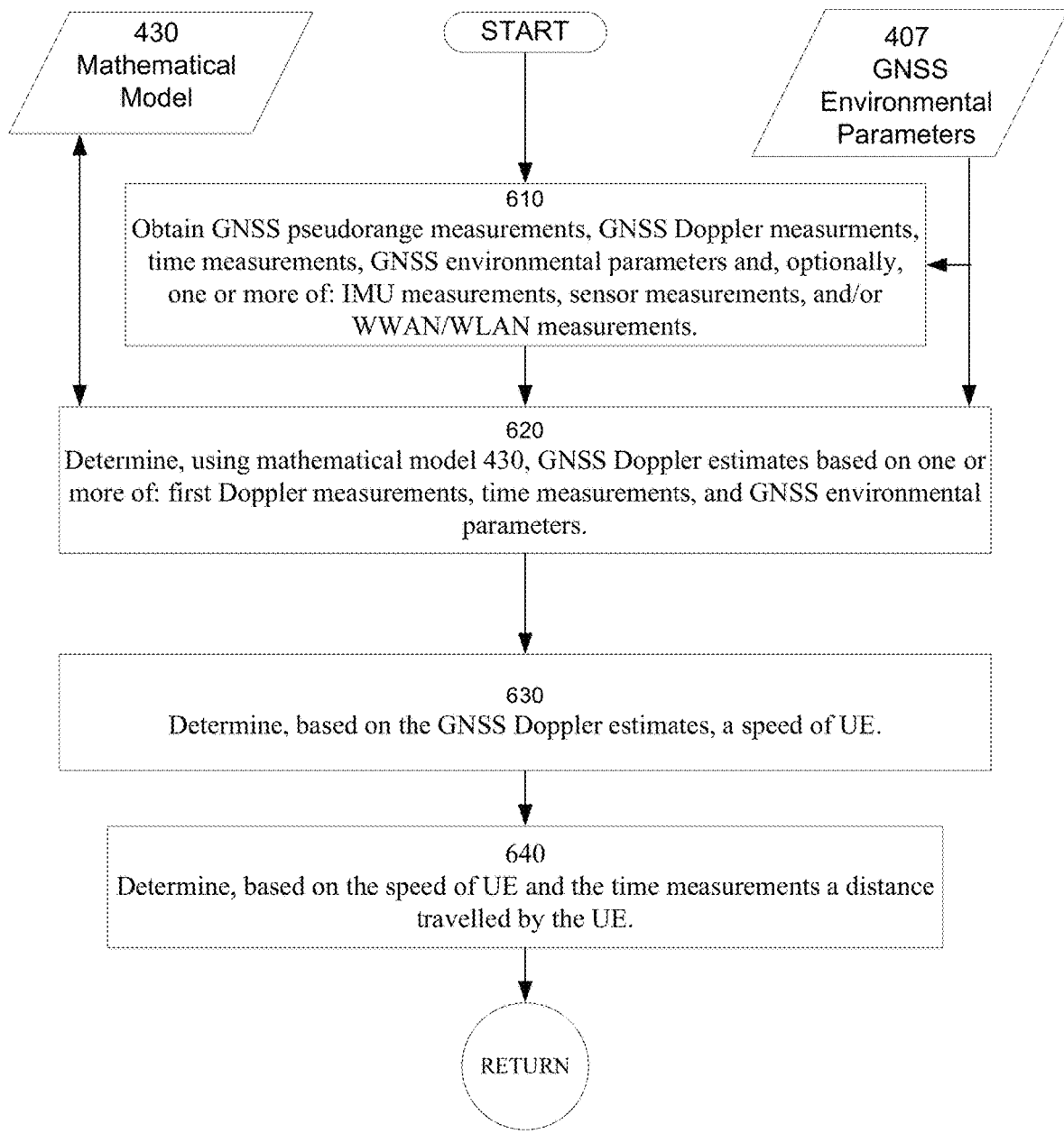
FIG. 6A shows a flowchart for a method to determine corrected GNSS Doppler estimates based on a mathematical model.

FIG. 6A shows a flowchart for a method 600 to determine a GNSS Doppler estimate based on mathematical model 430. In some embodiments, method 600 may be performed by UE 100 and/or processor(s) 150 and/or PE 156 on UE 100. Method 600 may be performed to mitigate GNSS Doppler measurement error when determining one or more position related parameters. In some embodiments, method 600 may be triggered by a positioning application such as a speed determination application or distance travelled application on UE 100.

In block 610, GNSS pseudorange measurements, GNSS Doppler measurements ($D_F$), time measurements, and GNSS environmental parameters 407 may be obtained over some time interval. In some embodiments, a reference time source may be used for time measurements. In some embodiments, GNSS Doppler measurements ($D_F$) may be obtained from a Kalman filter (e.g. implemented using processor(s) 150). In some embodiments, one or more of GNSS environmental parameters 407 may be obtained (e.g. as assistance data) from a WWAN and/or WLAN to which UE 100 may be communicatively coupled. In some embodiments, optionally, in block 610, one or more of: measurements from IMU170, and/or measurements from sensors 185, and/or WWAN/WLAN measurements may be used to augment GNSS pseudorange measurements.

In block 620, a GNSS Doppler estimate, Dc, may be determined using mathematical model 430. In some embodiments, the GNSS Doppler estimate, Dc, may correct corresponding GNSS Doppler measurements ($D_F$) obtained in block 610. In some embodiments, in block 620, mathematical model 430 may determine the GNSS Doppler estimate, Dc, based on one or more of: GNSS Doppler measurements ($D_F$), GNSS pseudorange measurements (P), time measurements, and GNSS environmental parameters 407. For example, the GNSS Doppler estimate, Dc, may be determined as Dc=h ($D_F$, P, E,), where h is a function (e.g. determined during mathematical model creation in FIG. 4A).

GNSS environmental parameters 407 may include SV fix related parameters, such as the number of satellites visible, dilution of precision (DOP), and other environmental conditions that may be obtained, determined and/or measured. The term "dilution of precision" relates to the effect of navigation satellite geometry on positional measurement precision. In some embodiments, GNSS environmental parameters 407 may include one or more of: GNSS timestamps (e.g. GPS Week/Sec), and/or the GNSS fix parameters (e.g. Latitude, Longitude, Altitude), and/or GNSS fix uncertainty (e.g. Horizontal Error Position Estimate, Horizontal Error Position Estimate Uncertainty, Altitude Uncertainty), and/or GNSS statistics (e.g. number of GPS/Glonass/Beidou satellites used, time between fixes (in seconds)), and/or GNSS derived factors (e.g. GNSS Heading, GNSS Heading Uncertainty, Horizontal Error Velocity Estimate, Horizontal Speed, Positional Dilution of Precision (PDOP), Horizontal Dilution of Precision (HDOP), Vertical Dilution of Precision (VDOP)), and/or the location source/fix type (e.g. whether GNSS Only, GNSS and Sensor Assisted, Sensor Based). In some embodiments, some GNSS environmental parameters (e.g. SV fix related parameters) may be provided to UE 100 as assistance data (e.g. via a WWAN/WLAN).

In block 630, one or more of: a speed of UE 100 based on the corrected Doppler measurement (Dc) may be determined and/or output. In some embodiments, the speed of UE 100 (e.g. as determined based on the corrected Doppler measurement) may be used, in conjunction with other measurements, to determine a position of UE 100 and/or other positioning related parameters.

In block 640, a distance travelled by UE 100 based on the speed (e.g. obtained from the GNSS Doppler estimate) and time measurements may be determined and/or output (e.g. to a calling routine and/or application on UE 100). In some embodiments, the output may be displayed to the user and/or may be output audibly (e.g. through a speaker on UE 100). In some embodiments, control may then return to a calling routine on UE 100.

Figure 6B:
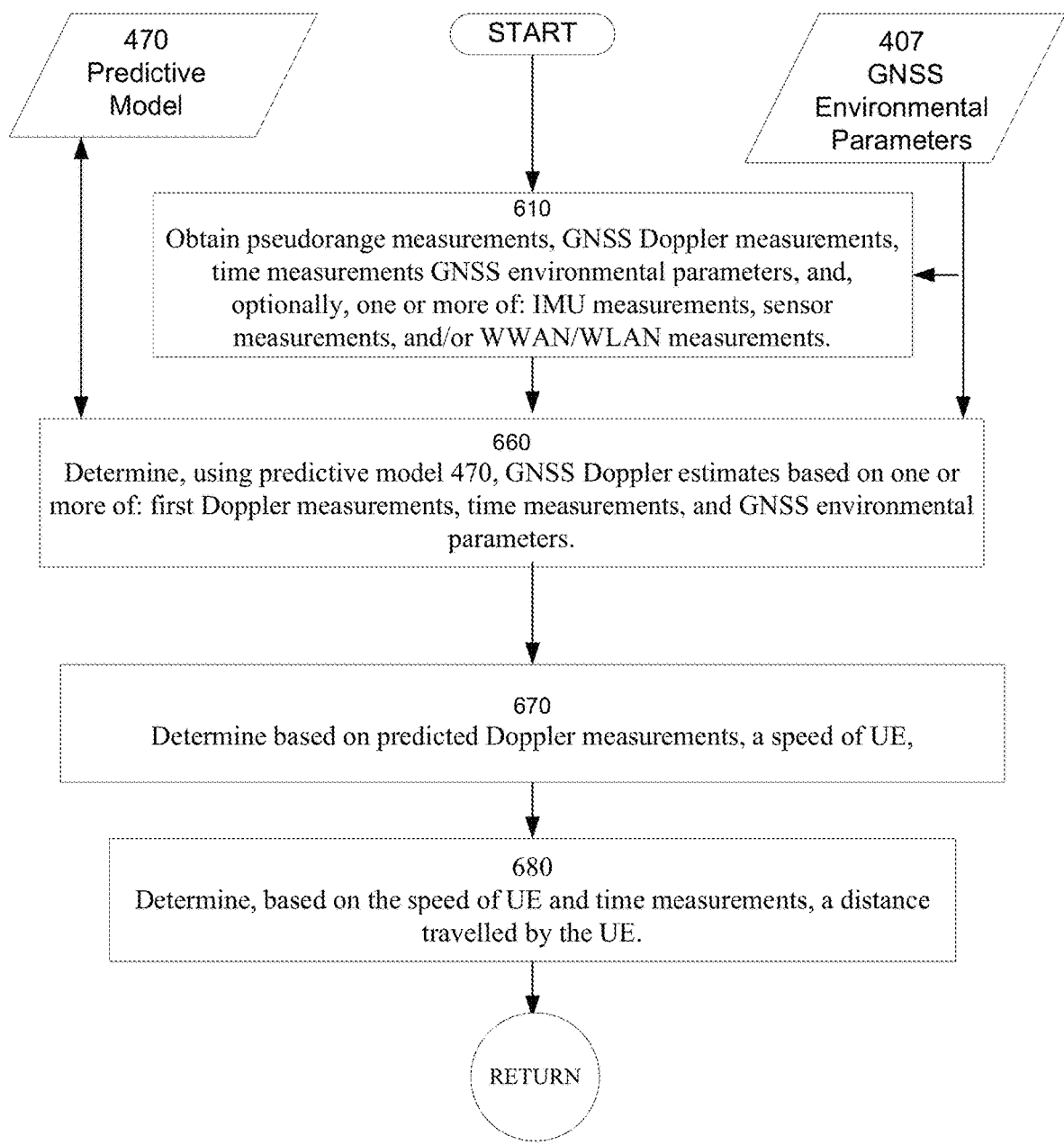
FIG. 6B shows a flowchart for a method to determine predicted Doppler estimates based on a predictive model.

FIG. 6B shows a flowchart for a method 650 to determine predicted GNSS Doppler estimates based on predictive model 470. In some embodiments, method 650 may be performed by UE 100 and/or processor(s) 150 and/or PE 156 on UE 100. Method 600 may be performed to mitigate measurement error when determining one or more position related parameters. In some embodiments, method 650 may be triggered by a positioning application such as a speed determination application or distance traveled application.

In block 610, GNSS pseudorange measurements, GNSS Doppler measurements ($D_F$), time measurements, and GNSS environmental parameters 407 may be obtained over some time interval. In some embodiments, a reference time source may be used for time measurements. In some embodiments, GNSS Doppler measurements ($D_F$) may be obtained from a Kalman filter (e.g. implemented using processor(s) 150). In some embodiments, one or more GNSS environmental parameters may be obtained (e.g. as assistance data) from a WWAN and/or WLAN to which UE 100 may be communicatively coupled. In some embodiments, optionally, in block 610, one or more of: measurements from IMU170, and/or measurements from sensors 185, and/or WWAN/WLAN measurements may be obtained for: (a) input to predictive model 470 (e.g. in block 660); and/or (b) augmenting GNSS pseudorange measurements.

In block 660, predicted GNSS Doppler estimates (Dp) (e.g. of UE 100) may be determined using predictive model 470. In some embodiments, in block 560, predictive model 470 may determine predicted GNSS Doppler estimates Dp based on one or more of: corresponding GNSS Doppler measurements ($D_F$), time measurements, and GNSS environmental parameters 407. In some embodiments, predictive model 470 may determine predicted GNSS Doppler estimates Dp based additionally on one or more of: measurements from IMU170, and/or measurements from sensors 185, and/or WWAN/WLAN measurements (e.g. when these were obtained in block 610).

In block 670, a speed of UE 100, may be determined based on the predicted Doppler estimates Dp (e.g. as determined in block 660). In some embodiments, the speed of UE 100 (e.g. as determined based on the predicted Doppler estimates $D_P$) may be used, in conjunction with other measurements, to determine a position of UE 100 and/or other positioning related parameters.

In block 680, a distance travelled by UE 100 based on the speed (e.g. obtained from the predicted Doppler estimates $D_P$) and time measurements may be determined and/or output (e.g. to a calling routine and/or application on UE 100). In some embodiments, the output may be displayed to the user and/or may be output audibly (e.g. through a speaker on UE 100). In some embodiments, control may then return to a calling routine on UE 100.

Figure 7:
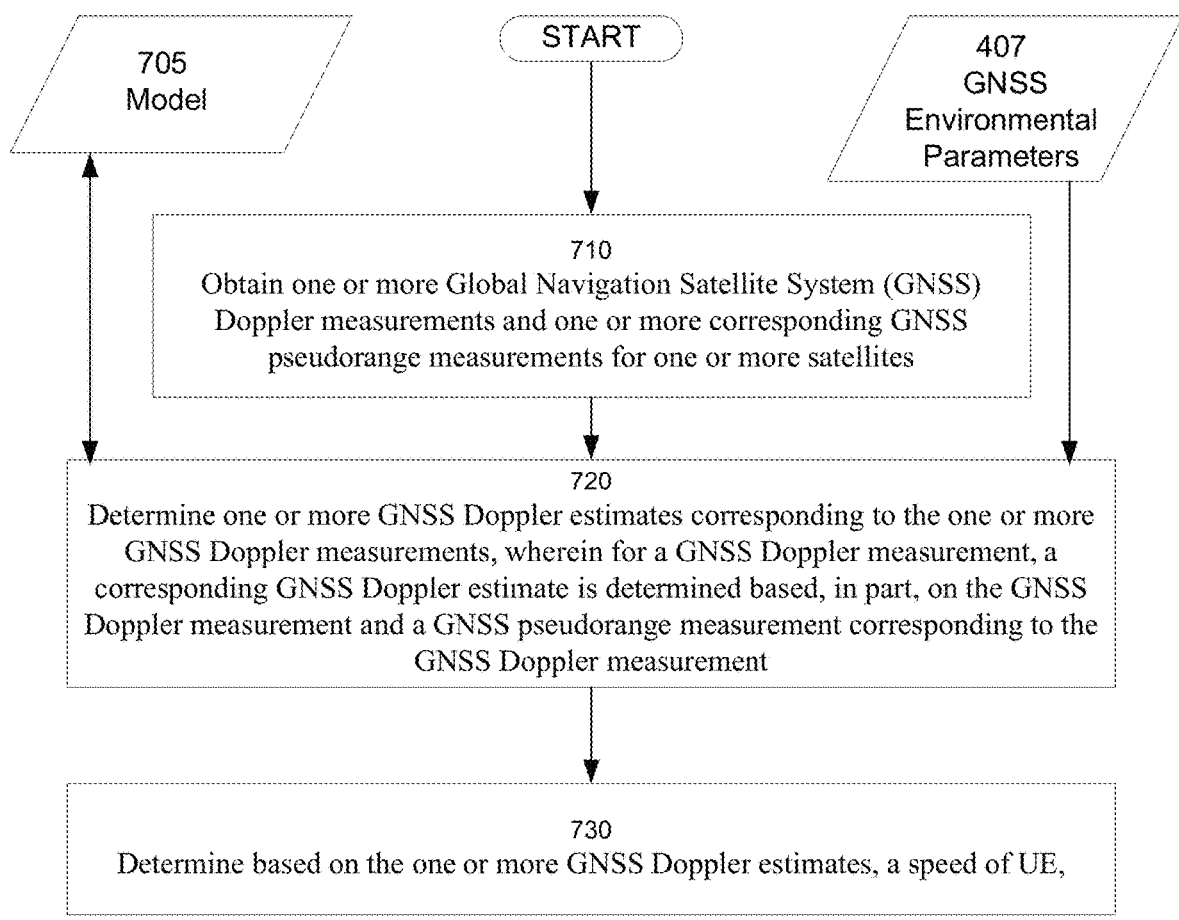
FIG. 7 shows a flowchart for a method to determine Doppler estimates based, in part, on GNSS Doppler measurements and GNSS pseudorange measurements.

FIG. 7 shows a flowchart for a method 700 to determine GNSS Doppler estimates based, in part, on GNSS Doppler measurements ($D_F$) and GNSS pseudorange measurements. In some embodiments, method 700 may be performed by UE 100 and/or processor(s) 150 and/or PE 156 on UE 100.

In block 710, one or more Global Navigation Satellite System (GNSS) Doppler measurements ($D_F$) and one or more corresponding GNSS pseudorange measurements for one or more satellites may be obtained at one or more measurement epochs.

In block 720, one or more GNSS Doppler estimates corresponding to the one or more GNSS Doppler measurements ($D_F$) may be determined, wherein for each GNSS Doppler measurement ($D_F$), the corresponding GNSS Doppler estimate may be determined based, in part, on the GNSS Doppler measurement ($D_F$) and a GNSS pseudorange measurement corresponding to the GNSS Doppler measurement ($D_F$). In some embodiments, GNSS Doppler measurements ($D_F$) may be obtained from a Kalman filter (e.g. implemented using processor(s) 150).

In some embodiments, the corresponding GNSS Doppler estimate may be determined (e.g. in block 720) based further on one or more GNSS environmental parameters associated with the GNSS Doppler measurement ($D_F$). The one or more GNSS environmental parameters may comprise: a GNSS timestamp associated with the GNSS Doppler measurement; or a GNSS position fix associated with the GNSS Doppler measurement ($D_F$); or a GNSS position fix uncertainty associated with the GNSS Doppler measurement ($D_F$); or a GNSS Heading and GNSS heading uncertainty associated with the GNSS Doppler measurement ($D_F$); or Dilution of Precision parameters associated with the GNSS Doppler measurement ($D_F$); or a type of position fix associated with the GNSS Doppler measurement ($D_F$).

In some embodiments, the corresponding GNSS Doppler estimate may be determined (e.g. in block 720) by determining, for the GNSS Doppler measurement ($D_F$), a correction, wherein the correction may be determined based on the GNSS Doppler measurement ($D_F$) and the pseudorange measurement corresponding to the GNSS Doppler measurement ($D_F$). The correction may be applied to the GNSS Doppler measurement ($D_F$) to obtain the corresponding GNSS Doppler estimate. In some embodiments, the correction may be determined further based on at least one of: one or more Inertial Measurement Unit (IMU) measurements, or one or more sensor measurements by the UE. In some embodiments, the correction may be determined based on model 705, which may take the form of a mathematical model.

In some embodiments, the corresponding GNSS Doppler estimate may be determined (e.g. in block 720) by predicting the corresponding GNSS Doppler estimate based on the GNSS Doppler measurement ($D_F$) and the GNSS pseudorange measurement corresponding to the GNSS Doppler measurement ($D_F$), wherein the corresponding GNSS Doppler estimate is predicted using model 705, which may take the form of a predictive model based on machine learning. In some embodiments, the predictive model may be based on one or more of: Linear Regression, and/or a Generalized Additive Model (GAM) and/or a Recursive Neural Network (RNN), and/or an Auto Regressive (AR) model, and/or Convolutional Neural Networks (CNNs), and/or Kalman backpropagation, and/or Fully Connected Networks (FCNs), and/or hybrid neural networks, and/or Generative Adversarial Networks (GANs), and/or adaptive boosting models, and/or variants thereof. In some embodiments, off the shelf or library based Light GBM implementations may be used (e.g. from the Distributed Machine Learning Toolkit (DMTK)) to obtain the predictive model. In some embodiments, the corresponding second GNSS Doppler estimate may be predicted based further on one or more of: Inertial Measurement Unit (IMU) measurements, or sensor measurements by the UE.

In block 730, a speed of the UE may be determined based, in part, on the GNSS Doppler estimates. In some embodiments, based on the speed of the UE over a time interval, a distance travelled by the UE may be determined. In some embodiments, other positioning related parameters may also be determined based on the GNSS Doppler estimates.

The methodologies described herein in flow charts and message flows may be implemented by various means depending upon the application. For example, these methodologies may be implemented in hardware, firmware, software, or any combination thereof. For a hardware implementation, the processor(s) 150 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

Although the disclosure is illustrated in connection with specific embodiments for instructional purposes, the disclosure is not limited thereto. Various adaptations and modifications may be made without departing from the scope Therefore, the spirit and scope of the appended claims should not be limited to the foregoing description.

What is claimed is:

1. A method of determining a speed of a user equipment (UE), the method comprising:

measuring Global Navigation Satellite System (GNSS) Doppler measurements and corresponding GNSS pseudorange measurements for GNSS satellites;

determining one or more GNSS Doppler estimates corresponding to the GNSS Doppler measurements, wherein for a GNSS Doppler measurement, a corresponding GNSS Doppler estimate is determined based, in part, on the GNSS Doppler measurement and a GNSS pseudorange measurement corresponding to the GNSS Doppler measurement; and determining the speed of the UE based, at least in part, on the GNSS Doppler estimates.

2. The method of claim 1, wherein the corresponding GNSS Doppler estimate is determined based further on one or more GNSS environmental parameters associated with the GNSS Doppler measurement.

3. The method of claim 2, wherein the one or more GNSS environmental parameters associated with the GNSS Doppler measurement comprise one or more of:

a GNSS timestamp associated with the GNSS Doppler measurement; or a GNSS position fix associated with the GNSS Doppler measurement; or a GNSS position fix uncertainty associated with the GNSS Doppler measurement; or a GNSS Heading and GNSS heading uncertainty associated with the GNSS Doppler measurement; or Dilution of Precision parameters associated with the GNSS Doppler measurement; or a type of position fix associated with the GNSS Doppler measurement.

4. The method of claim 1, wherein determining the corresponding GNSS Doppler estimate comprises:

determining, for the GNSS Doppler measurement, a correction, wherein the correction is determined based on the GNSS Doppler measurement and the pseudorange measurement corresponding to the GNSS Doppler measurement; and applying the correction to the GNSS Doppler measurement to obtain the corresponding GNSS Doppler estimate.

5. The method of claim 4, wherein the correction is determined further based on at least one of: one or more Inertial Measurement Unit (IMU) measurements, or one or more sensor measurements by the UE.

6. The method of claim 4, wherein the correction is determined based on a mathematical model.

7. The method of claim 1, wherein determining the corresponding GNSS Doppler estimate comprises:

predicting the corresponding GNSS Doppler estimate based on the GNSS Doppler measurement and the GNSS pseudorange measurement corresponding to the GNSS Doppler measurement, wherein the corresponding GNSS Doppler estimate is predicted using a predictive model based on machine learning.

8. The method of claim 7, wherein the predictive model is based on at least one of:

a Generalized Additive Model (GAM), or a Recursive Neural Network (RNN), or a Convolutional Neural Network (CNN), or a Fully Connected Network (FCN), or an adaptive boosting model, or a Generative Adversarial Network (GAN), or a combination thereof.

9. The method of claim 7, wherein the corresponding GNSS Doppler estimate is predicted based in part on one or more of: Inertial Measurement Unit (IMU) measurements, or sensor measurements by the UE.

10. The method of claim 1, further comprising:
determining, based on the speed of the UE over a time interval, a distance travelled by the UE.

11. A User Equipment (UE) comprising:
a Global Navigation Satellite System (GNSS) receiver capable of receiving GNSS signals, wherein the GNSS receiver is configured to measure GNSS Doppler measurements and corresponding GNSS pseudorange measurements for GNSS satellites; and
a processor coupled to the GNSS receiver, wherein the processor is configured to:
determine GNSS Doppler estimates corresponding to the one or GNSS Doppler measurements, wherein for a GNSS Doppler measurement, a corresponding GNSS Doppler estimate is determined based, in part, on the GNSS Doppler measurement and a GNSS pseudorange measurement corresponding to the GNSS Doppler measurement; and
determine a speed of the UE based, at least in part, on the GNSS Doppler estimates.

12. The UE of claim 11, wherein processor is configured to determine the corresponding GNSS Doppler estimate based further on one or more GNSS environmental parameters associated with the GNSS Doppler measurement.

13. The UE of claim 12, wherein the one or more GNSS environmental parameters associated with the GNSS Doppler measurement comprise one or more of:
a GNSS timestamp associated with the GNSS Doppler measurement; or
a GNSS position fix associated with the GNSS Doppler measurement; or
a GNSS position fix uncertainty associated with the GNSS Doppler measurement; or
a GNSS Heading and GNSS heading uncertainty associated with the GNSS Doppler measurement; or
Dilution of Precision parameters associated with the GNSS Doppler measurement; or
a type of position fix associated with the GNSS Doppler measurement.

14. The UE of claim 11, wherein to determine the corresponding GNSS Doppler estimate, the processor is configured to:
determine, for the GNSS Doppler measurement, a correction, wherein the correction is determined based on the GNSS Doppler measurement and the pseudorange measurement corresponding to the GNSS Doppler measurement; and
apply the correction to the GNSS Doppler measurement to obtain the corresponding GNSS Doppler estimate.

15. The UE of claim 14, wherein the correction is determined further based on at least one of: one or more Inertial Measurement Unit (IMU) measurements, or one or more sensor measurements by the UE.

16. The UE of claim 14, wherein the correction is determined based on a mathematical model.

17. The UE of claim 11, wherein to determine the corresponding GNSS Doppler estimate, processor is configured to:
predict the corresponding GNSS Doppler estimate based on the GNSS Doppler measurement and the GNSS pseudorange measurement corresponding to the GNSS Doppler measurement, wherein the corresponding GNSS Doppler estimate is predicted using a predictive model based on machine learning.

18. The UE of claim 17, wherein the predictive model is based on at least one of:
a Generalized Additive Model (GAM), or
a Recursive Neural Network (RNN), or
a Convolutional Neural Network (CNN), or
a Fully Connected Network (FCN), or
an adaptive boosting model, or
a Generative Adversarial Network (GAN), or
a combination thereof.

19. The UE of claim 17, wherein the corresponding GNSS Doppler estimate is predicted based in part on one or more of: Inertial Measurement Unit (IMU) measurements, or sensor measurements by the UE.

20. The UE of claim 11, wherein processor is further configured to:
determine, based on the speed of the UE over a time interval, a distance travelled by the UE.

21. A User Equipment (UE) comprising:
means for measuring GNSS Doppler measurements and corresponding GNSS pseudorange measurements for GNSS satellites;
means for determining one or more GNSS Doppler estimates corresponding to the GNSS Doppler measurements, wherein for a GNSS Doppler measurement, a corresponding GNSS Doppler estimate is determined based, in part, on the GNSS Doppler measurement and a GNSS pseudorange measurement corresponding to the GNSS Doppler measurement; and
means for determining a speed of the UE based, at least in part, on the GNSS Doppler estimates.

22. The UE of claim 21, wherein the corresponding GNSS Doppler estimate is determined based further on one or more GNSS environmental parameters associated with the GNSS Doppler measurement.

23. The UE of claim 21, wherein the means for determining the corresponding GNSS Doppler estimate comprises:
means for determining, for the GNSS Doppler measurement, a correction, wherein the correction is determined based on the GNSS Doppler measurement and the pseudorange measurement corresponding to the GNSS Doppler measurement; and
means for applying the correction to the GNSS Doppler measurement to obtain the corresponding GNSS Doppler estimate.

24. The UE of claim 23, wherein the correction is determined based on a mathematical model.

25. The UE of claim 21, wherein the means for determining GNSS Doppler estimates further comprises:
means for predicting the corresponding GNSS Doppler estimate based on the GNSS Doppler measurement and the GNSS pseudorange measurement corresponding to the GNSS Doppler measurement, wherein the means for predicting the corresponding GNSS Doppler estimate comprises a predictive model based on machine learning.

26. A non-transitory computer-readable medium comprising executable instructions that, when executed, cause to configure a processor on a User Equipment (UE) to:
obtain measure one or more GNSS Doppler measurements and one or more corresponding GNSS pseudorange measurements for one or more GNSS satellites;
determine one or more GNSS Doppler estimates corresponding to the one or more GNSS Doppler measurements, wherein for a GNSS Doppler measurement, a corresponding GNSS Doppler estimate is determined based, in part, on the GNSS Doppler measurement and a GNSS pseudorange measurement corresponding to the GNSS Doppler measurement; and determine a speed of the UE based, at least in part, on the one or more GNSS Doppler estimates.

27. The computer-readable medium of claim 26, wherein the corresponding GNSS Doppler estimate is determined based further on one or more GNSS environmental parameters associated with the GNSS Doppler measurement.

28. The computer-readable medium of claim 26, wherein the executable instructions to determine the corresponding GNSS Doppler estimate further configure the processor to:

determine, for the GNSS Doppler measurement, a correction, wherein the correction is determined based on the GNSS Doppler measurement and the pseudorange measurement corresponding to the GNSS Doppler measurement; and apply the correction to the GNSS Doppler measurement to obtain the corresponding GNSS Doppler estimate.

29. The computer-readable medium of claim 28, wherein the correction is determined based on a mathematical model.

30. The computer-readable medium of claim 26, wherein the executable instructions to determine the corresponding GNSS Doppler estimate further configure the processor to:

predict the corresponding GNSS Doppler estimate based on the GNSS Doppler measurement and the GNSS pseudorange measurement corresponding to the GNSS Doppler measurement, wherein the corresponding GNSS Doppler estimate is predicted using a predictive model based on machine learning.

* * * * *